United States Patent
Urabe et al.

(10) Patent No.: US 11,111,875 B2
(45) Date of Patent: Sep. 7, 2021

(54) SLIDING STRUCTURE FOR INTERNAL COMBUSTION ENGINE, METHOD FOR CONTROLLING IDLING OPERATION, AND METHOD FOR CONTROLLING OPERATION OF INTERNAL COMBUSTION ENGINE

(71) Applicant: NIPPON PISTON RING CO., LTD., Saitama (JP)

(72) Inventors: Mitsuru Urabe, Saitama (JP); Hirokazu Murata, Saitama (JP); Kazuhiko Kanno, Saitama (JP); Jyuta Tase, Saitama (JP); Kazumi Moroi, Saitama (JP)

(73) Assignee: NIPPON PISTON RING CO., LTD.

( * ) Notice: Subject to any disclaimer, the term of this patent is extended or adjusted under 35 U.S.C. 154(b) by 209 days.

(21) Appl. No.: 16/305,657

(22) PCT Filed: May 30, 2017

(86) PCT No.: PCT/JP2017/020128
§ 371 (c)(1),
(2) Date: Nov. 29, 2018

(87) PCT Pub. No.: WO2017/209135
PCT Pub. Date: Dec. 7, 2017

(65) Prior Publication Data
US 2020/0325844 A1 Oct. 15, 2020

(30) Foreign Application Priority Data

May 31, 2016 (JP) .............................. JP2016-108814
Feb. 15, 2017 (JP) .............................. JP2017-026032

(51) Int. Cl.
*F02F 1/20* (2006.01)
*F16J 9/12* (2006.01)
(Continued)

(52) U.S. Cl.
CPC ................ *F02F 1/20* (2013.01); *F02F 1/004* (2013.01); *F02F 3/00* (2013.01); *F16J 9/12* (2013.01); *F02D 2200/02* (2013.01)

(58) Field of Classification Search
CPC . F02F 1/20; F02F 2001/006; F16J 9/12; F16J 1/08; F16J 9/203; F01M 2011/022
See application file for complete search history.

(56) References Cited

U.S. PATENT DOCUMENTS 8,381,696 B2    2/2013  Urabe et al.
10,267,258 B2 *  4/2019  Maki ....................... F02F 1/004
(Continued)

FOREIGN PATENT DOCUMENTS

CN    101809271 A    8/2010
CN    103597193 A    2/2014
(Continued)

OTHER PUBLICATIONS

International Search Report (in English and Japanese) issued in. PCT/JP2017/020128, dated Aug. 1, 2017; ISA/JP.

*Primary Examiner* — Long T Tran
(74) *Attorney, Agent, or Firm* — Harness, Dickey & Pierce, P.L.C.

(57) ABSTRACT

In a sliding structure for an internal combustion, a cylinder has recesses in a stroke center region. Piston rings have inclined surfaces on an outer circumferential surface, and a lubricating oil flows between the inner wall surface and the outer circumferential surface that relatively move via the inclined surfaces. At any RPM equal to or greater than at idle, a center friction coefficient at the stroke center region through which the piston rings pass at the highest speed is less than a center friction coefficient when no recesses are formed in the stroke center region. Contrarily, at the RPM, an outside friction coefficient when the piston rings pass through a region outside the stroke center region is less than (Continued)

an outside friction coefficient when the recesses are formed in the outside region. As a result, further improved low fuel efficiency is achieved for the dimple liner technique.

29 Claims, 23 Drawing Sheets

(51) Int. Cl.
  *F02F 1/00* (2006.01)
  *F02F 3/00* (2006.01)

(56) References Cited

U.S. PATENT DOCUMENTS

| | | | | |
|---|---|---|---|---|
| 2010/0288222 A1* | 11/2010 | Urabe | ............... | F02F 1/20 |
| | | | | 123/193.2 |
| 2012/0132069 A1* | 5/2012 | Roh | ............... | F02F 1/20 |
| | | | | 92/153 |
| 2014/0182540 A1* | 7/2014 | Johansson | ............... | F02F 1/24 |
| | | | | 123/193.2 |
| 2014/0345453 A1* | 11/2014 | Oh | ............... | F02F 1/004 |
| | | | | 92/169.1 |
| 2016/0153392 A1* | 6/2016 | Meirelles Tomanik | ... | F16J 9/26 |
| | | | | 123/668 |
| 2017/0009888 A1* | 1/2017 | Pegg | ............... | F16J 10/02 |
| 2018/0066602 A1* | 3/2018 | Park | ............... | F02F 1/20 |
| 2019/0186407 A1* | 6/2019 | Burns | ............... | F02F 1/004 |

FOREIGN PATENT DOCUMENTS

| | | |
|---|---|---|
| DE | 4429649 A1 | 2/1996 |
| JP | 2000-129492 A | 5/2000 |
| JP | 2007-132247 A | 5/2007 |
| JP | 2010-107032 A | 5/2010 |
| JP | 2010-138711 A | 6/2010 |
| JP | 2010-236444 A | 10/2010 |
| JP | 2011-075065 A | 4/2011 |
| JP | 5155924 B2 | 3/2013 |

* cited by examiner

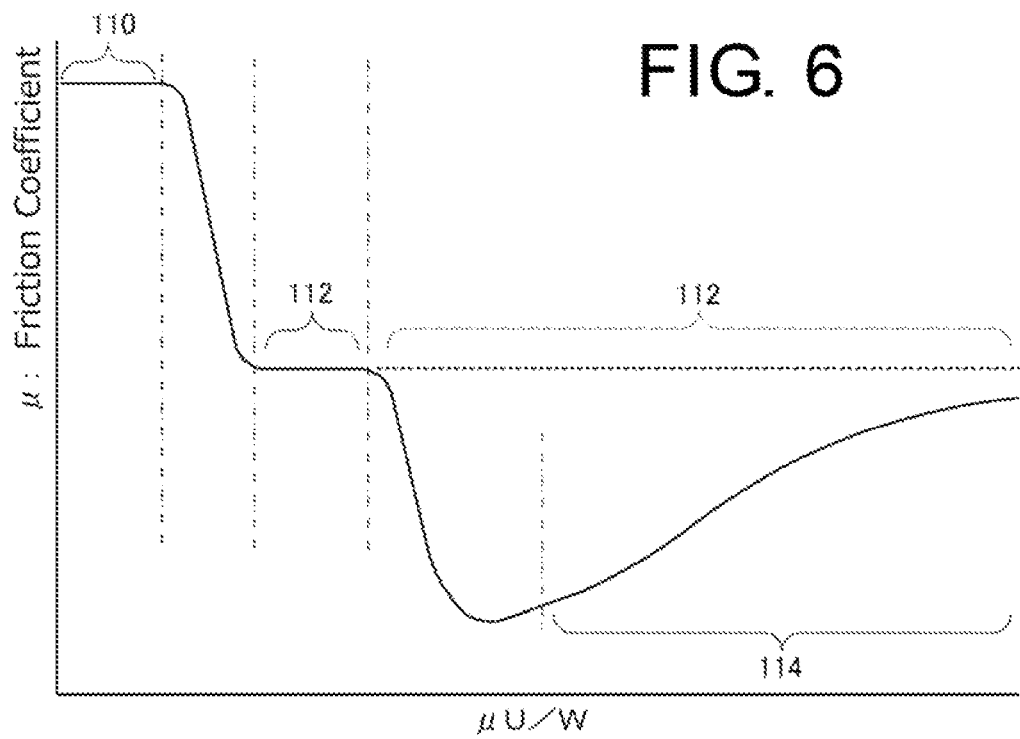

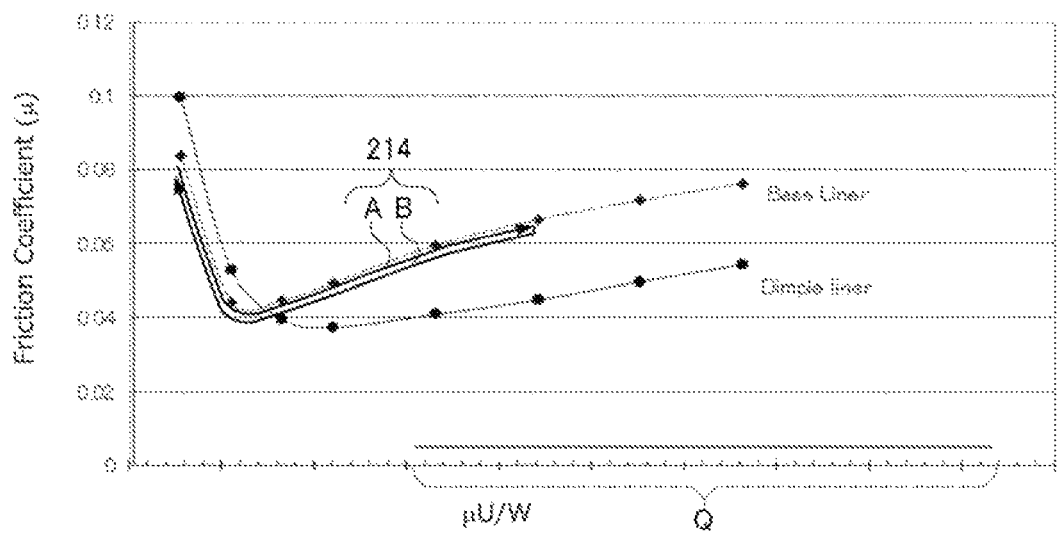

|  | Example Experiment 1 | Example Experiment 2 | Example Experiment 3 | Comparative Example 1 | Comparative Example 2 |
|---|---|---|---|---|---|
| P (mm) | 45 | 10 | 10 | 0 | 115(0) |
| Q (mm) | 70 | 105 | 70 | 115 | 0 |
| R (mm) | 0 | 0 | 35 | 0 | 0(115) |
| S (mm) | 115 | 115 | 115 | 115 | 115 |
| P/S (%) | 39.1 | 8.6 | 8.6 | 0 | 100 |
| LOC | Increase by 5% | Increase by 60% | Increase by 60% | Increase by 90% | Reference |

SLIDING STRUCTURE FOR INTERNAL COMBUSTION ENGINE, METHOD FOR CONTROLLING IDLING OPERATION, AND METHOD FOR CONTROLLING OPERATION OF INTERNAL COMBUSTION ENGINE

CROSS-REFERENCE TO RELATED APPLICATIONS

This application is a U.S. National Phase application of International Application No. PCT/JP2017/020128, filed on May 30, 2017, which claims priority to Japanese Application No. 2016-108814, filed on May 31, 2016 and Japanese Application No. 2017-026032, filed on Feb. 15, 2017. The entire disclosures of the above applications are incorporated herein by reference.

BACKGROUND

Technical Field

The present invention relates to a sliding structure for an internal combustion engine having a cylinder and a piston, and the like.

Related Art

Conventionally, for the internal combustion engine having a cylinder and a piston, efforts have been made to reduce the sliding resistance (frictional force) between the cylinder and the piston in order to improve fuel efficiency and reduce oil consumption. As a technique for reducing the frictional force between the piston rings and the cylinder, the applicant of the present application has developed a so-called dimple liner technique (for example, see the publication of Japanese Patent No. 5155924) for reducing the sliding resistance at the time of operation, for example, by forming a plurality of recesses in the stroke center region of the inner wall surface of the cylinder.

Although publicly unknown as of this application, further studies by the inventors have made it clear that there still remains a possibility of, for example, further improving fuel efficiency for the dimple liner technique. On the other hand, it has also been made clear that an attempt to improve fuel efficiency by the dimple liner technique causes an increase in oil consumption at the same time.

In view of these circumstances, the present invention has been developed to further improve fuel efficiency and reduce oil consumption for the dimple liner.

SUMMARY OF THE INVENTION

The present invention for achieving the aforementioned objects is a sliding structure for an internal combustion engine having a cylinder and a piston, and is a sliding structure of a cylinder and a piston characterized in that: on an inner wall surface of the cylinder, a plurality of recesses are formed in all or part of a stroke center region from a lower surface position of a ring groove of a lowermost piston ring at a top dead center of the piston to an upper surface position of a ring groove of an uppermost piston ring at a bottom dead center of the piston; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; at any RPM equal to or greater than an RPM for an idling operation of the internal combustion engine, a friction coefficient (hereafter, a center friction coefficient) between the inner wall surface and the outer circumferential surface at a place of the stroke center region through which the piston rings pass at a highest speed is set to be less than the center friction coefficient when it is assumed that the recesses are not formed in the stroke center region; and on the other hand, at any RPM equal to or greater than the RPM for the idling operation of the internal combustion engine, a friction coefficient (hereafter, an outside friction coefficient) between the inner wall surface and the outer circumferential surface when the piston rings pass through any place in an outside region that is outside the stroke center region is set to be less than the outside friction coefficient when it is assumed that the plurality of recesses are formed in the outside region.

The present invention for achieving the aforementioned objects is a sliding structure for an internal combustion engine having a cylinder and a piston and is a sliding structure of a cylinder and a piston characterized in that: on an inner wall surface of the cylinder, a plurality of recesses are formed in all or part of a stroke center region from a lower surface position of a ring groove of a lowermost piston ring at a top dead center of the piston to an upper surface position of a ring groove of an uppermost piston ring at a bottom dead center of the piston; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and at any RPM equal to or greater than an RPM for an idling operation of the internal combustion engine, a friction coefficient (hereafter, a boundary center side friction coefficient) when the piston rings pass through a vicinity toward the stroke center region adjacent to a boundary between the stroke center region and an outside region outside the stroke center region is set to be less than a friction coefficient (hereafter, a boundary outside friction coefficient) when the piston rings pass through a vicinity toward the outside region adjacent to the boundary.

The present invention relating to the sliding structure of a cylinder and a piston is characterized in that: at any RPM equal to or greater than the RPM for the idling operation of the internal combustion engine, a friction coefficient (hereafter, a center friction coefficient) between the inner wall surface and the outer circumferential surface at a place of the stroke center region through which the piston rings pass at a highest speed is set to be less than the center friction coefficient when it is assumed that the recesses are not formed in the stroke center region; and on the other hand, at any RPM equal to or greater than the RPM for the idling operation of the internal combustion engine, a friction coefficient (hereafter, an outside friction coefficient) between the inner wall surface and the outer circumferential surface when the piston rings pass through any place in an outside region that is outside the stroke center region is set to be less than the outside friction coefficient when it is assumed that the plurality of recesses are formed in the outside region.

The present invention for achieving the aforementioned purposes is a sliding structure for an internal combustion engine having a cylinder and a piston, and is a sliding structure of a cylinder and a piston characterized in that: on an inner wall surface of the cylinder, a stroke center region having a plurality of recesses below an edge of a reference stroke region on a side of a top dead center is formed from a lower surface position of a ring groove of a lowermost piston ring at the top dead center of the piston to an upper surface position of a ring groove of an uppermost piston ring at a bottom dead center of the piston (hereafter to be referred to as the reference stroke region); on the inner wall surface, an upper smooth region not having the recesses is formed entirely from the edge of the reference stroke region on the side of the top dead center to an edge of the stroke center region on the side of the top dead center; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; at any RPM equal to or greater than an RPM for an idling operation of the internal combustion engine, a friction coefficient (hereafter, a center friction coefficient) between the inner wall surface and the outer circumferential surface at a place of the stroke center region through which the piston rings pass at a highest speed is set to be less than the center friction coefficient when it is assumed that the recesses are not formed in the stroke center region; and on the other hand, at any RPM equal to or greater than the RPM for the idling operation of the internal combustion engine, a friction coefficient (hereafter, an outside friction coefficient) between the inner wall surface and the outer circumferential surface when the piston rings pass through any place in an outside region that is outside the stroke center region is set to be less than the outside friction coefficient when it is assumed that the plurality of recesses are formed in the outside region.

The present invention relating to the sliding structure of a cylinder and a piston is characterized in that a distance of the upper smooth region in a stroke direction is set to 30% or greater of a total distance of the reference stroke region.

The present invention relating to the sliding structure of a cylinder and a piston is characterized in that a center point of the stroke center region in the stroke direction is located on a side of the bottom dead center of the piston with respect to a center point of the reference stroke region in the stroke direction.

The present invention relating to the sliding structure of a cylinder and a piston is characterized in that when a position at which the uppermost piston ring passes through the inner wall surface at a highest speed is defined as a fastest speed point, an edge of the stroke center region on the side of the top dead center is set to a point at or below the fastest speed point.

The present invention for achieving the aforementioned objects is a sliding structure for an internal combustion engine having a cylinder and a piston, and is a sliding structure of a cylinder and a piston characterized in that: on an inner wall surface of the cylinder, a stroke center region having a plurality of recesses below an edge of a reference stroke region on a side of a top dead center is formed from a lower surface position of a ring groove of a lowermost piston ring at the top dead center of the piston to an upper surface position of a ring groove of an uppermost piston ring at a bottom dead center of the piston (hereafter to be referred to as the reference stroke region); on the inner wall surface, an upper smooth region not having the recesses is formed entirely from the edge of the reference stroke region on a side of the top dead center to an edge of the stroke center region on the side of the top dead center; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and at any RPM equal to or greater than an RPM for an idling operation of the internal combustion engine, a friction coefficient (hereafter, a boundary center side friction coefficient) when the piston rings pass through a vicinity toward the stroke center region adjacent to a boundary between the stroke center region and an outside region outside the stroke center region is set to be less than a friction coefficient (hereafter, a boundary outside friction coefficient) when the piston rings pass through a vicinity toward the outside region adjacent to the boundary.

The present invention relating to the sliding structure of a cylinder and a piston is characterized in that a distance of the upper smooth region in a stroke direction is set to 30% or greater of a total distance of the reference stroke region.

The present invention relating to the sliding structure of a cylinder and a piston is characterized in that a center point of the stroke center region in the stroke direction is located on a side of the bottom dead center of the piston with respect to a center point of the reference stroke region in the stroke direction.

The present invention relating to the sliding structure of the cylinder and the piston is characterized in that when a position at which the uppermost piston ring passes through the inner wall surface at a highest speed is defined as a fastest speed point, an edge of the stroke center region on the side of the top dead center is set to a point at or below the fastest speed point.

The present invention relating to the sliding structure of a cylinder and a piston is characterized in that: at any RPM equal to or greater than the RPM for the idling operation of the internal combustion engine, a friction coefficient (hereafter, a center friction coefficient) between the inner wall surface and the outer circumferential surface at a place of the stroke center region through which the piston rings pass at a highest speed is set to be less than the center friction coefficient when it is assumed that the recesses are not formed in the stroke center region; and on the other hand, at any RPM equal to or greater than the RPM for the idling operation of the internal combustion engine, a friction coefficient (hereafter, an outside friction coefficient) between the inner wall surface and the outer circumferential surface when the piston rings pass through any place in an outside region that is outside the stroke center region is set to be less than the outside friction coefficient when it is assumed that the plurality of recesses are formed in the outside region.

The present invention relating to the sliding structure of a cylinder and a piston is characterized in that a ratio ($\mu1/\mu2$) of the boundary outside friction coefficient $\mu1$ to the boundary center side friction coefficient $\mu2$ is set to within a range of 2.5 or less.

The present invention relating to the sliding structure of a cylinder and a piston is characterized in that the ratio ($\mu1/\mu2$) of the boundary outside friction coefficient $\mu1$ to the boundary center side friction coefficient $\mu2$ is set to within a range of 1.5 or less.

The present invention relating to the sliding structure of a cylinder and a piston is characterized in that a maximum distance of the inclined surfaces from the inner wall surface is set to $1/2000$ or greater of an actual contact width of the outer circumferential surface.

The present invention relating to the sliding structure of a cylinder and a piston is characterized in that a sliding surface of the piston rings to the cylinder is provided with a base member, a hard first layer formed on the base member, and a second layer which is deposited on the first layer and softer than the first layer.

The present invention relating to the sliding structure of a cylinder and a piston is characterized in that the first layer has a surface roughness (Ra) of 0.7 µm or less.

The present invention for achieving the aforementioned objects provides a method for controlling an idling operation of an internal combustion engine having a cylinder and a piston. The method for controlling an idling operation of an internal combustion engine is characterized in that: on an inner wall surface of the cylinder, a plurality of recesses are formed in all or part of a stroke center region from a lower surface position of a ring groove of a lowermost piston ring at a top dead center of the piston to an upper surface position of a ring groove of an uppermost piston ring at a bottom dead center of the piston; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and an RPM at an idling operation of the internal combustion engine is controlled so as to satisfy a condition A and a condition B below:

Condition A: a friction coefficient (hereafter, a center friction coefficient) between the inner wall surface and the outer circumferential surface at a place of the stroke center region through which the piston rings pass at a highest speed is to be less than the center friction coefficient when it is assumed that the recesses are not formed in the stroke center region; and Condition B: a friction coefficient (hereafter, an outside friction coefficient) between the inner wall surface and the outer circumferential surface at any place of an outside region that is outside the stroke center region is to be less than the outside friction coefficient when it is assumed that the plurality of recesses are formed in the outside region.

The present invention for achieving the aforementioned objects provides a method for controlling an idling operation of an internal combustion engine having a cylinder and a piston. The method for controlling an idling operation of an internal combustion engine is characterized in that: on an inner wall surface of the cylinder, a plurality of recesses are formed in all or part of a stroke center region from a lower surface position of a ring groove of a lowermost piston ring at a top dead center of the piston to an upper surface position of a ring groove of an uppermost piston ring at a bottom dead center of the piston; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and an RPM at an idling operation of the internal combustion engine is controlled so as to satisfy a condition C below:

Condition C: a friction coefficient (hereafter, a boundary center side friction coefficient) when the piston rings pass through a vicinity toward the stroke center region adjacent to a boundary between the stroke center region and an outside region outside the stroke center region is set to be less than a friction coefficient (hereafter, a boundary outside friction coefficient) when the piston rings pass through a vicinity toward the outside region adjacent to the boundary.

The present invention relating to the method for controlling an idling operation of an internal combustion engine is characterized in that the RPM at the idling operation of the internal combustion engine is controlled so as to satisfy a condition A and a condition B below:

Condition A: a friction coefficient (hereafter, a center friction coefficient) between the inner wall surface and the outer circumferential surface at a place of the stroke center region through which the piston rings pass at a highest speed is to be less than the center friction coefficient when it is assumed that the recesses are not formed in the stroke center region; and Condition B: a friction coefficient (hereafter, an outside friction coefficient) between the inner wall surface and the outer circumferential surface at any place of an outside region that is outside the stroke center region is to be less than the outside friction coefficient when it is assumed that the plurality of recesses are formed in the outside region.

The present invention relating to the method for controlling an idling operation of an internal combustion engine is characterized in that the RPM at the idling operation of the internal combustion engine is controlled so as to satisfy a condition D below:

Condition D: a ratio ($\mu1/\mu2$) of the boundary outside friction coefficient $\mu1$ to the boundary center side friction coefficient $\mu2$ is to be within a range of 2.5 or less.

The present invention for achieving the aforementioned objects provides a method for controlling an idling operation of an internal combustion engine having a cylinder and a piston. The method for controlling an idling operation of an internal combustion engine is characterized in that: on the inner wall surface of the cylinder, a stroke center region having a plurality of recesses below an edge of a reference stroke region on a side of a top dead center is formed from a lower surface position of a ring groove of a lowermost piston ring at the top dead center of the piston to an upper surface position of a ring groove of an uppermost piston ring at a bottom dead center of the piston (hereafter to be referred to as the reference stroke region); on the inner wall surface, an upper smooth region not having the recesses is formed entirely from the edge of the reference stroke region on the side of the top dead center to an edge of the stroke center region on the side of the top dead center; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and an RPM at an idling operation of the internal combustion engine is controlled so as to satisfy a condition A and a condition B below:

Condition A: a friction coefficient (hereafter, a center friction coefficient) between the inner wall surface and the outer circumferential surface at a place of the stroke center region through which the piston rings pass at a highest speed is to be less than the center friction coefficient when it is assumed that the recesses are not formed in the stroke center region; and Condition B: a friction coefficient (hereafter, an outside friction coefficient) between the inner wall surface and the outer circumferential surface at any place of an outside region that is outside the stroke center region is to be less than the outside friction coefficient when it is assumed that the plurality of recesses are formed in the outside region.

The present invention for achieving the aforementioned objects provides a method for controlling an idling operation of an internal combustion engine having a cylinder and a piston. The method for controlling an idling operation of an internal combustion engine is characterized in that: on the inner wall surface of the cylinder, a stroke center region having a plurality of recesses below an edge of a reference stroke region on a side of a top dead center is formed from a lower surface position of a ring groove of a lowermost piston ring at the top dead center of the piston to an upper surface position of a ring groove of an uppermost piston ring at a bottom dead center of the piston (hereafter to be referred to as the reference stroke region); on the inner wall surface, an upper smooth region not having the recesses is formed entirely from the edge of the reference stroke region on the side of the top dead center to an edge of the stroke center region on the side of the top dead center; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and an RPM at an idling operation of the internal combustion engine is controlled so as to satisfy a condition C below:

Condition C: a friction coefficient (hereafter, a boundary center side friction coefficient) when the piston rings pass through a vicinity toward the stroke center region adjacent to a boundary between the stroke center region and an outside region outside the stroke center region is set to be less than a friction coefficient (hereafter, a boundary outside friction coefficient) when the piston rings pass through a vicinity toward the outside region adjacent to the boundary.

The present invention relating to the method for controlling an idling operation of an internal combustion engine is characterized in that the RPM at the idling operation of the internal combustion engine is controlled so as to satisfy a condition A and a condition B below:

Condition A: a friction coefficient (hereafter, a center friction coefficient) between the inner wall surface and the outer circumferential surface at a place of the stroke center region through which the piston rings pass at a highest speed is to be less than the center friction coefficient when it is assumed that the recesses are not formed in the stroke center region; and Condition B: a friction coefficient (hereafter, an outside friction coefficient) between the inner wall surface and the outer circumferential surface at any place of an outside region that is outside the stroke center region is to be less than the outside friction coefficient when it is assumed that the plurality of recesses are formed in the outside region.

The present invention relating to the method for controlling idling operation of the internal combustion engine is characterized in that the RPM at the idling operation of the internal combustion engine is controlled so as to satisfy a condition D below:

Condition D: a ratio ($\mu1/\mu2$) of the boundary outside friction coefficient $\mu1$ to the boundary center side friction coefficient $\mu2$ is to be within the range of 2.5 or less.

The present invention relating to the method for controlling an idling operation of an internal combustion engine is characterized in that a distance of the upper smooth region in a stroke direction is set to 30% or greater of a total distance of the reference stroke region.

The present invention relating to the method for controlling an idling operation of an internal combustion engine is characterized in that a center point of the stroke center region in the stroke direction is located on a side of the bottom dead center of the piston with respect to the center point of the reference stroke region in the stroke direction.

The present invention relating to the method for controlling an idling operation of an internal combustion engine is characterized in that when a position at which the uppermost piston ring passes through the inner wall surface at the highest speed is defined as a fastest speed point, the edge of the stroke center region on the side of the top dead center is set to a point at or below the fastest speed point.

The present invention for achieving the aforementioned objects provides a method for controlling an operation of an internal combustion engine having a cylinder and a piston. The method for controlling an operation of an internal combustion engine is characterized in that: on an inner wall surface of the cylinder, a plurality of recesses are formed in all or part of a stroke center region from a lower surface position of a ring groove of a lowermost piston ring at a top dead center of the piston to an upper surface position of a ring groove of an uppermost piston ring at a bottom dead center of the piston; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and an RPM of the internal combustion engine is controlled so as to satisfy a condition A and a condition B below:

Condition A: a friction coefficient (hereafter, a center friction coefficient) between the inner wall surface and the outer circumferential surface at a place of the stroke center region through which the piston rings pass at a highest speed is to be less than the center friction coefficient when it is assumed that the recesses are not formed in the stroke center region; and Condition B: a friction coefficient (hereafter, an outside friction coefficient) between the inner wall surface and the outer circumferential surface at any place of an outside region that is outside the stroke center region is to be less than the outside friction coefficient when it is assumed that the plurality of recesses are formed in the outside region.

The present invention for achieving the aforementioned objects provides a method for controlling an operation of an internal combustion engine having a cylinder and a piston. The method for controlling an operation of an internal combustion engine is characterized in that: on an inner wall surface of the cylinder, a plurality of recesses are formed in all or part of a stroke center region from a lower surface position of a ring groove of a lowermost piston ring at a top dead center of the piston to an upper surface position of a ring groove of an uppermost piston ring at a bottom dead center of the piston; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and an RPM of the internal combustion engine is controlled so as to satisfy a condition C below:

Condition C: a friction coefficient (hereafter, a boundary center side friction coefficient) when the piston rings pass through a vicinity toward the stroke center region adjacent to a boundary between the stroke center region and an outside region outside the stroke center region is set to be less than a friction coefficient (hereafter, a boundary outside friction coefficient) when the piston rings pass through a vicinity toward the outside region adjacent to the boundary.

The present invention for achieving the aforementioned objects provides a method for controlling an operation of an internal combustion engine having a cylinder and a piston. The method for controlling an operation of an internal combustion engine is characterized in that: on an inner wall surface of the cylinder, a stroke center region having a plurality of recesses below an edge of a reference stroke region on a side of a top dead center is formed from a lower surface position of a ring groove of a lowermost piston ring at the top dead center of the piston to an upper surface position of a ring groove of an uppermost piston ring at a bottom dead center of the piston (hereafter to be referred to as the reference stroke region); on the inner wall surface, an upper smooth region not having the recesses is formed entirely from the edge of the reference stroke region on the side of the top dead center to an edge of the stroke center region on the side of the top dead center; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and an RPM of the internal combustion engine is controlled so as to satisfy a condition A and a condition B below:

Condition A: a friction coefficient (hereafter, a center friction coefficient) between the inner wall surface and the outer circumferential surface at a place of the stroke center region through which the piston rings pass at a highest speed is to be less than the center friction coefficient when it is assumed that the recesses are not formed in the stroke center region; and Condition B: a friction coefficient (hereafter, an outside friction coefficient) between the inner wall surface and the outer circumferential surface at any place of an outside region that is outside the stroke center region is to be less than the outside friction coefficient when it is assumed that the plurality of recesses are formed in the outside region.

The present invention for achieving the aforementioned objects provides a method for controlling an operation of an internal combustion engine having a cylinder and a piston. The method for controlling an operation of an internal combustion engine is characterized in that: on the inner wall surface of the cylinder, a stroke center region having a plurality of recesses below an edge of a reference stroke region on a side of a top dead center is formed from a lower surface position of a ring groove of a lowermost piston ring at the top dead center of the piston to an upper surface position of a ring groove of an uppermost piston ring at a bottom dead center of the piston (hereafter to be referred to as the reference stroke region); on the inner wall surface, an upper smooth region not having the recesses is formed entirely from the edge of the reference stroke region on the side of the top dead center to an edge of the stroke center region on the side of the top dead center; the piston rings installed in the ring grooves of the piston are configured such that both outer edges of an outer circumferential surface thereof in an axial direction opposed to the inner wall surface are provided with inclined surfaces that can be in contact with the inner wall surface while being inclined away from the inner wall surface outwardly in the axial direction, and a lubricating oil flows into a gap between the inner wall surface and the outer circumferential surface that relatively move via the inclined surfaces, thereby enabling fluid lubrication; and an RPM of the internal combustion engine is controlled so as to satisfy a condition C below:

Condition C: a friction coefficient (hereafter, a boundary center side friction coefficient) when the piston rings pass through a vicinity toward the stroke center region adjacent to a boundary between the stroke center region and an outside region outside the stroke center region is set to be less than a friction coefficient (hereafter, a boundary outside friction coefficient) when the piston rings pass through a vicinity toward the outside region adjacent to the boundary.

The present invention relating to the method for controlling an operation of an internal combustion engine is characterized in that a distance of the upper smooth region in a stroke direction is set to 30% or greater of a total distance of the reference stroke region.

The present invention relating to a method for controlling operation of an internal combustion engine is characterized in that a center point of the stroke center region in the stroke direction is located on a side of the bottom dead center of the piston with respect to the center point of the reference stroke region in the stroke direction.

The present invention relating to a method for controlling operation of an internal combustion engine is characterized in that when a position at which the uppermost piston ring passes through the inner wall surface at the highest speed is defined as a fastest speed point, the edge of the stroke center region on the side of the top dead center is set to a point at or below the fastest speed point.

Advantageous Effects of Invention

The present invention enables providing outstanding effects of improving fuel efficiency or reducing oil consumption.

BRIEF DESCRIPTION OF THE DRAWINGS

FIG. 6 is a Stribeck diagram relating to the sliding of a typical internal combustion engine.

FIG. 7A is a Stribeck diagram for describing a sliding structure for an internal combustion engine of this embodiment; and FIG. 7B is a side view illustrating a sliding stroke between a cylinder liner and piston rings.

DETAILED DESCRIPTION OF THE PREFERRED EMBODIMENTS

A description will next be given of embodiments of the present invention with reference to the accompanying drawings. First, the sliding structure for an internal combustion engine according to an embodiment of the present invention will be described in detail.

Cylinder Liner

Figure 1:
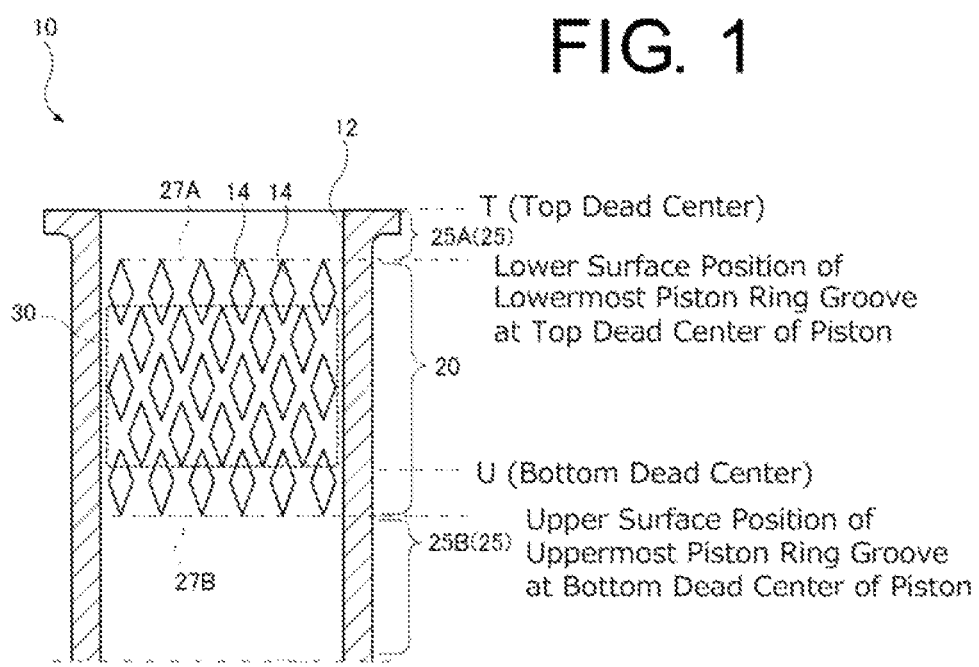
FIG. 1 is a cross-sectional view illustrating a cylinder liner in the axial direction to be applied to a sliding structure for an internal combustion engine according to an embodiment of the present invention.

As illustrated in FIG. 1, a cylinder liner 10 of an internal combustion engine according to this embodiment has a plurality of recesses 14 formed on an inner wall surface 12 thereof. The recesses 14 are formed only within a stroke center region 20 of the inner wall surface 12. The stroke center region 20 refers to the whole or part of the region having the maximum range that extends from the lower surface position of the ring groove of the lowermost piston ring at a top dead center T of a piston 30 to the upper surface position of the ring groove of the uppermost piston ring at a bottom dead center U of the piston 30 (here, illustrated by way of example is the case where the whole range is the stroke center region 20 in which the recesses 14 are formed). When a region outside the stroke center region 20 is defined as an outside region 25, the outside region 25 is configured from an upper outside region 25A adjacent to the stroke center region 20 on the side of the top dead center and a lower outside region 25B adjacent to the stroke center region 20 on the side of the bottom dead center. The piston 30 reciprocates repeatedly through the cylinder liner 10 sequentially in the following order: the upper outside region 25A, the stroke center region 20, the lower outside region 25B, the stroke center region 20, and the upper outside region 25A. Note that the boundary between the upper outside region 25A and the stroke center region 20 is defined as an upper boundary 27A, and the boundary between the lower outside region 25B and the stroke center region 20 is defined as a lower boundary 27B.

The recesses 14 are disposed in a manner such that at least one of the recesses 14 is present in a cross section orthogonal to the axial direction at any place on the inner wall surface 12 of the stroke center region 20. That is, the recesses 14 are disposed so as to overlap with each other in the axial direction. As a result, the outer circumferential surface of a piston ring passing through the stroke center region 20 is always opposed to at least one of the recesses 14. On the other hand, no recesses 14 are formed in the upper outside region 25A and the lower outside region 25B.

Figure 2A:
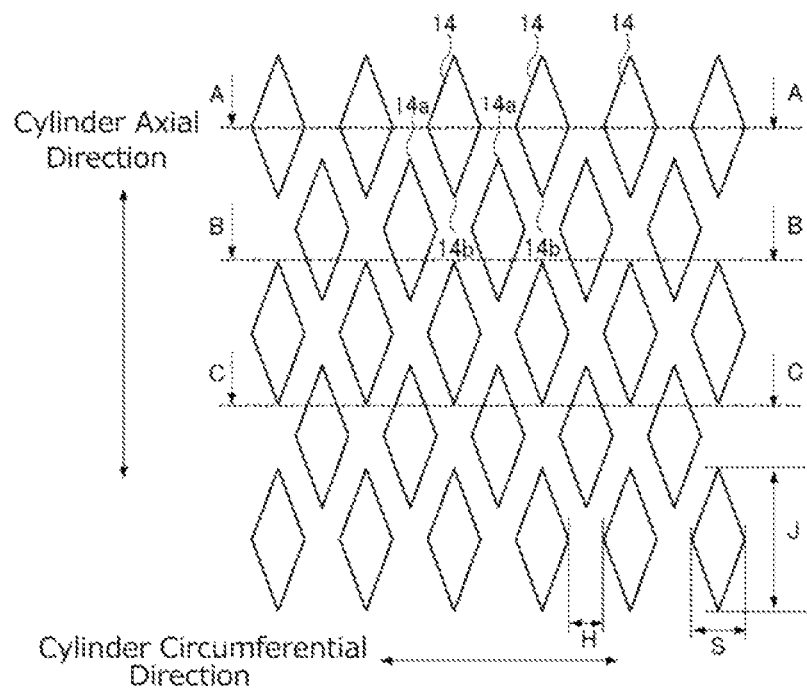
FIGS. 2A and 2B are each a developed view illustrating the inner circumferential wall of the cylinder liner that is developed in the circumferential direction.

The recesses 14 are formed in the shape of a quadrate (square or rectangle) that is disposed diagonally relative to the axial direction, and as a result, the plurality of recesses 14 are disposed in a diagonal grid as a whole. Focusing attention on a particular recess 14 as illustrated in the developed view of FIG. 2A, the aforementioned arrangement allows the lowermost point 14b of the recess 14 in the axial direction to be located axially below the uppermost point 14a of another recess 14 in the axial direction. As described above, since the plurality of recesses 14 axially overlap with each other, the recess 14 is always present at any place in a cross section orthogonal to the axial direction (for example, in an arrow view A, an arrow view B, or an arrow view C) in the stroke center region 20. Here, in the stroke center region 20, the plurality of recesses 14 each having the same area are uniformly arranged in the surface direction (the axial direction and the circumferential direction).

Figure 2B:
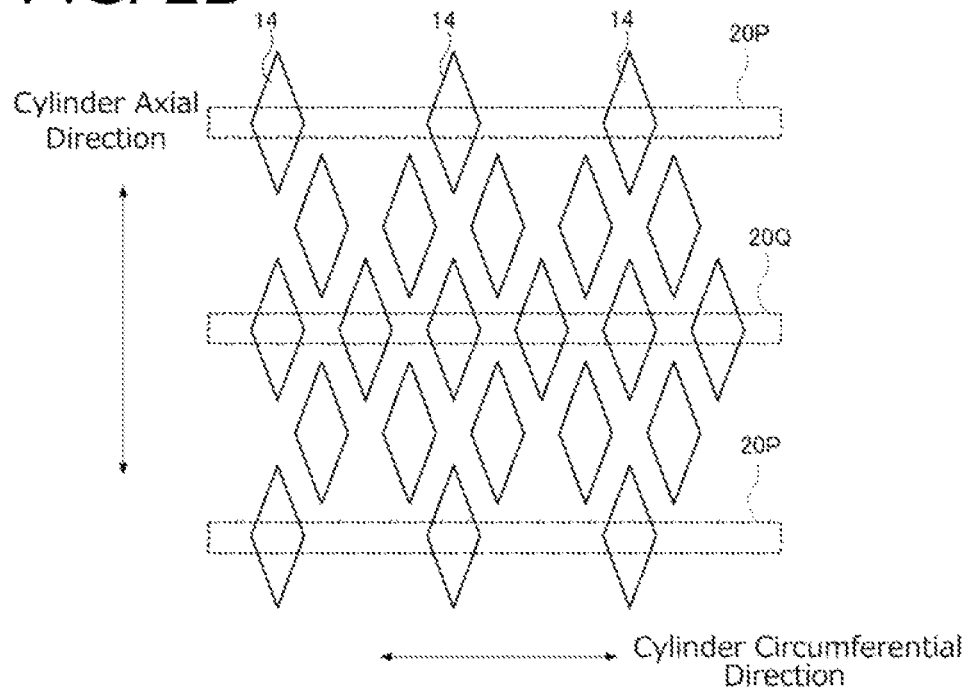

Note that as illustrated in the developed view of FIG. 2B, the plurality of recesses 14 each having the same area may also be arranged unevenly in the surface direction. Here, a circumferential strip-shaped region 20P at an end portion of the stroke center region 20 in the axial direction is reduced in the area occupied by the plurality of recesses 14, whereas a circumferential strip-shaped region 20Q at the center of the stroke center region 20 in the axial direction is increased in the area occupied by the plurality of recesses 14.

The recesses 14 are not limited to a particular size or shape, but may be selected, as appropriate, depending on the size or the purpose of the cylinder or the piston ring. For example, the recesses 14 may be formed in a slit shape or a strip shape so as to pierce (or extend through) the stroke center region 20 in the cylinder axial direction. On the other hand, from the viewpoint of the hermeticity of the cylinder, the maximum average length J (see FIG. 2A) of the recess 14 in the cylinder axial direction should be less than the length (thickness) of the piston ring (top ring) located at the uppermost position of the piston in the cylinder axial direction, specifically preferably about 5 to 100% thereof. The average length J of the recesses 14 refers to the average value of the variations of the maximum sizes of the plurality of recesses 14 in the axial direction.

The recesses 14 have the maximum average length S in the cylinder circumferential direction preferably within the range of 0.1 mm to 15 mm, and desirably within the range of 0.3 mm to 5 mm. Those less than these ranges may provide insufficient sliding area reduction effects by the recesses 14 themselves. On the other hand, those greater than these ranges may cause part of a piston ring to be readily caught in a recess, leading to the occurrence of a problem such as a distortion of the piston ring.

Figure 3:
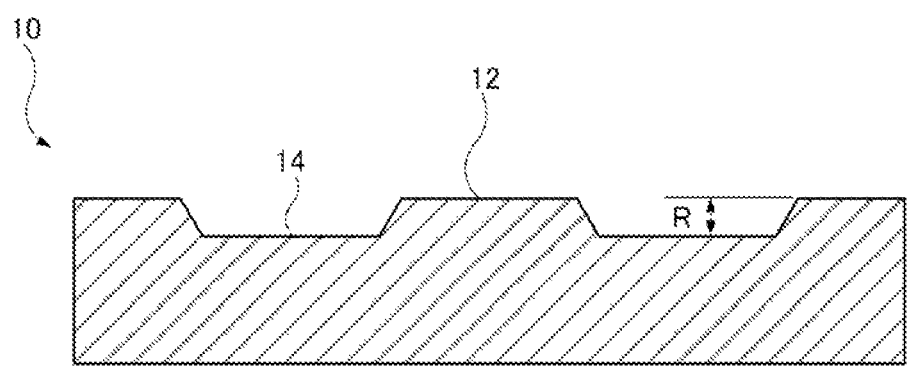
FIG. 3 is a cross-sectional view illustrating the inner circumferential wall of the cylinder liner orthogonal to the axial direction.

As illustrated in FIG. 3, the recesses 14 should have the maximum average length R (the maximum average depth R) in the cylinder radial direction preferably within the range of 0.1 μm to 1000 μm, and desirably within the range of 0.1 μm to 500 μm. More desirably, the setting should be made to 0.1 μm to 50 μm. The maximum average length R of the recesses 14 in the cylinder radial direction being less than these ranges may provide insufficient sliding area reduction effects by the recesses 14 themselves. On the other hand, those greater than these ranges may lead to difficulty with processing, causing a problem, for example, a need of increasing the cylinder in thickness.

Referring back to FIG. 2, the average value of the minimum distances H in the cylinder circumferential direction between the adjacent recesses 14 in the circumferential direction at the same axial position is preferably within the range of 0.05 mm to 15 mm, and in particular, more preferably within the range of 0.1 mm to 5.0 mm. Those less than these ranges would lead to an excessively small contact area (sliding area) between the piston ring and the cylinder liner, thus causing a possibility of being incapable of sliding with stability. On the other hand, those greater than these ranges may cause insufficient sliding area reduction effects by the recesses 14 themselves.

Figure 14:
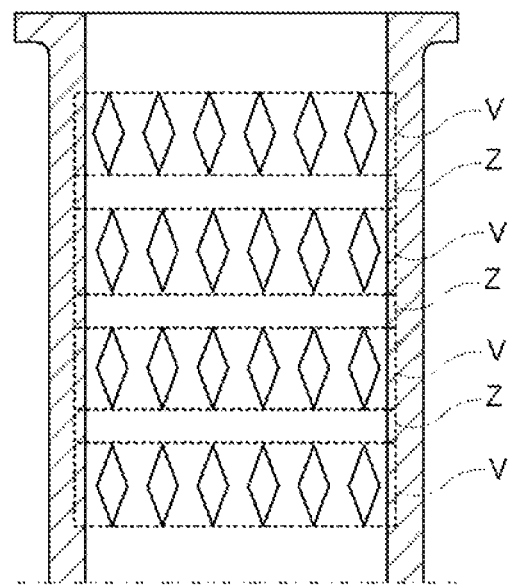
FIG. 14 is a cross-sectional view illustrating an example of a cylinder liner, to which the micro texture technique is applied, in the axial direction of the cylinder liner.

In this regard, a description will now be briefly given of the micro texture technique which seemingly resembles to the dimple liner technique but is basically different therefrom. As illustrated in FIG. 14, the micro texture is in the theory that a region V where recesses are formed and a region Z where no recesses exist are alternately repeated in the cylinder axial direction of the inner wall surface of the cylinder liner, so that each time a piston ring moves on the inner wall surface, an engine oil is allowed to flow in and out of the recesses, and the dynamic pressure is employed to increase the oil film thickness and thereby reduce frictional force. Thus, unlike this embodiment, the basic technical concept is different from the dimple liner technique that a plurality of recesses are disposed to overlap with each other in the axial direction.

Piston and Piston Ring

Figure 4A:
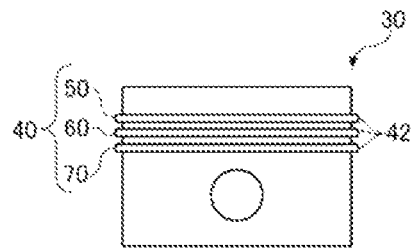
FIG. 4A is a side view illustrating a piston and piston rings to be applied to the sliding structure for an internal combustion engine.
Figure 4B:
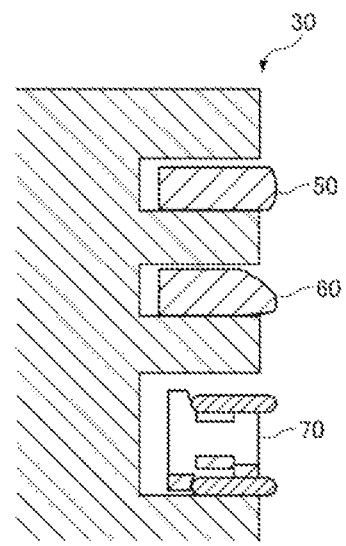
FIG. 4B is a partially enlarged cross-sectional view illustrating the piston and the piston rings.

FIG. 4A and FIG. 4B illustrate a piston 30 and piston rings 40 (a top ring 50, a second ring 60, and an oil ring 70) that are set up in the ring grooves of the piston 30. The piston rings 40 reciprocate in the cylinder axial direction with the outer circumferential surfaces 42 opposed to the inner wall surface 12 of the cylinder liner 10. The top ring 50 fills the gap between the piston 30 and the cylinder liner 10 to prevent the phenomenon (blowby) that a compression gas escapes from the combustion chamber toward the crank case. Like the top ring 50, the second ring 60 serves to fill the gap between the piston 30 and the cylinder liner 10 and as well, scrape redundant engine oil that is adhered to the inner wall surface 12 of the cylinder liner 10. The oil ring 70 scrapes redundant engine oil that is adhered to the inner wall surface 12 of the cylinder liner 10 and then forms a moderate oil film, preventing the seizure of the piston 30.

Figure 4C:
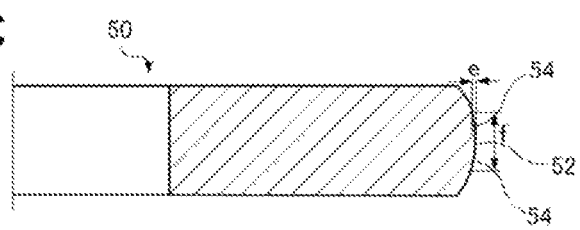
FIG. 4C is a partially enlarged cross-sectional view illustrating a top ring.

As shown in the enlarged view of FIG. 4C, the top ring 50, which is a single annular member, has a so-called barrel shape which is protruded radially outwardly when an outer circumferential surface 52 is viewed in cross section. More specifically, both the outer edges of the outer circumferential surface 52 in the cylinder axial direction have inclined surfaces 54, 54 that are capable of being in contact with the inner wall surface 12 while being inclined away from the inner wall surface 12 outwardly in the cylinder axial direction. That is, the inclined surfaces 54, 54, which have a so-called sagging shape, are formed by a break-in operation of the piston 30 and the piston rings 40 being performed and the resulting contact wear therebetween. The maximum distance e of the inclined surfaces 54, 54 from the inner wall surface 12 is set to $\frac{1}{2000}$ to $\frac{1}{500}$ the actual contact width f of the outer circumferential surface 52, and more preferably $\frac{1}{1500}$ to $\frac{1}{500}$. In this embodiment, it is about $\frac{1}{1000}$. Note that the actual contact width f means the range that is capable of being substantially in contact with the inner wall surface 12 by sliding while the top ring 50 is slightly inclined or distorted relative to the inner wall surface 12, and includes the entire inclined surfaces 54, 54 on both ends. The actual contact width f is preferably formed to be, for example, 0.3 mm or less.

Figure 4D:
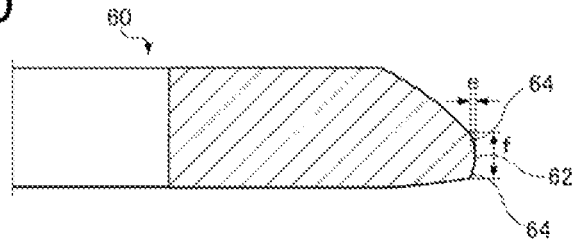
FIG. 4D is a partially enlarged cross-sectional view illustrating a second ring.

As shown in the enlarged view of FIG. 4D, the second ring 60 or a single annular member has a so-called barrel shape which is protruded radially outwardly when an outer circumferential surface 62 is viewed in cross section. Like the top ring, both the outer edges of the outer circumferential surface 62 in the cylinder axial direction have inclined surfaces 64, 64 that are capable of being in contact with the inner wall surface 12 while being inclined away from the inner wall surface 12 outwardly in the cylinder axial direction. The inclined surfaces 64, 64, which have a so-called sagging shape, are formed by a break-in operation of the piston 30 and the piston rings 40 being performed and the resulting contact wear therebetween. The maximum distance e of the inclined surfaces 64, 64 from the inner wall surface 12 is set to $\frac{1}{2000}$ to $\frac{1}{500}$ the actual contact width f of the outer circumferential surface 62, and more preferably $\frac{1}{1500}$ to $\frac{1}{500}$. In this embodiment, it is about $\frac{1}{1000}$. In the case of a vehicular internal combustion engine, the actual contact width f is preferably formed to be, for example, 0.3 mm or less.

Figure 5A:
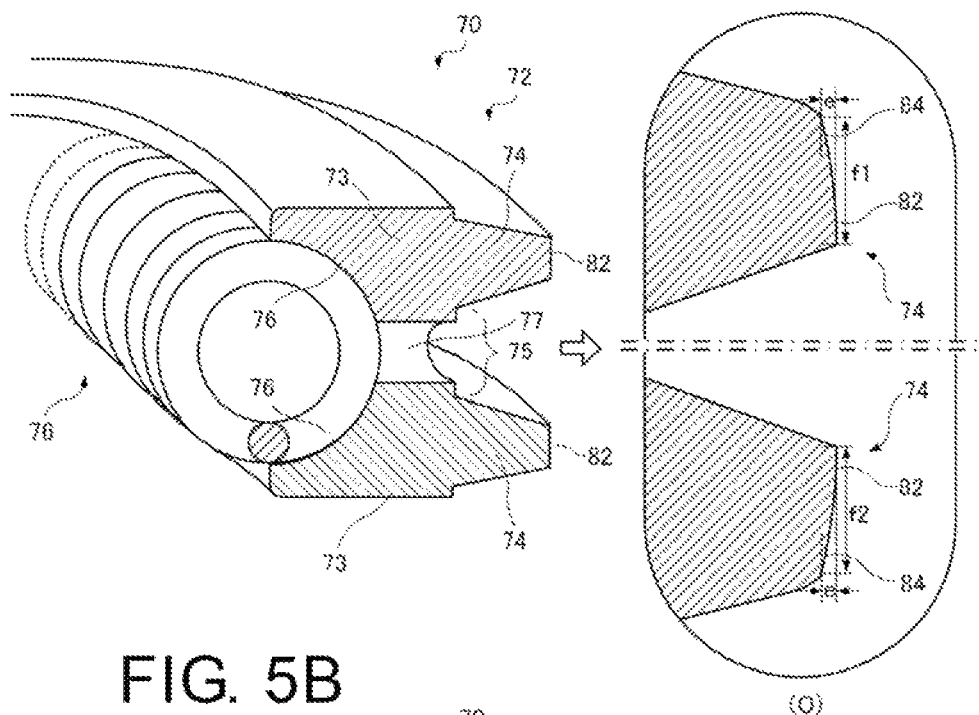
FIG. 5A is a cross-sectional view illustrating a 2-piece type oil ring.

The oil ring 70 of a 2-piece type shown in the enlarged view of FIG. 5A has a ring body 72 and a coil expander 76 formed in a coil-spring shape. The ring body 72 has a pair of annular rails 73, 73 to be disposed at both ends in the axial direction, and an annular column 75 to be interposed between the pair of rails 73, 73 so as to couple the same together. The sectional shape of the pair of rails 73, 73 and the column 75 in combination is generally I-shaped or H-shaped, and with the help of this shape, an inner circumferential groove 76 having a semicircular arc shape in cross section for accommodating the coil expander 76 is formed on the inner circumferential surface side. Furthermore, the pair of rails 73, 73 have respective annular projections 74, 74 which are formed to be radially outwardly protruded with respect to the column 75. Outer circumferential surfaces 82, 82 to be formed on the protruded end of the annular projections 74, 74 are in contact with the inner wall surface 12 of the cylinder liner 10. The coil expander 76 biases the ring body 72 under pressure radially outwardly by being accommodated in the inner circumferential groove 76. Note that the column 75 of the ring body 72 is provided with a plurality of oil drain holes 77 formed in the circumferential direction.

As further shown in an enlarged region O of FIG. 5A, since the pair of outer circumferential surfaces 82, 82 are formed integrally with the ring body 72, both the outer circumferential surfaces 82, 82 can be defined in combination as a single outer circumferential surface 83. On both outer edges of the single outer circumferential surface 83 in the cylinder axial direction, inclined surfaces 84, 84 that are capable of being in contact with the inner wall surface 12, while being inclined away from the inner wall surface 12 outwardly in the cylinder axial direction, are formed. The inclined surfaces 84, 84, which have a so-called sagging shape, are formed by a break-in operation of the piston 30 and the piston rings 40 being performed and the resulting contact wear therebetween. The maximum distance e of the inclined surfaces 84, 84 from the inner wall surface 12 is set to $\frac{1}{2000}$ to $\frac{1}{500}$ the actual contact width f, which is the total value of the actual contact widths f1, f2 of each outer circumferential surface 82, more preferably to $\frac{1}{1500}$ to $\frac{1}{500}$. In this embodiment, it is about $\frac{1}{1000}$. Note that the actual contact width f is preferably formed to be 0.02 mm to 0.18 mm.

Figure 5B:
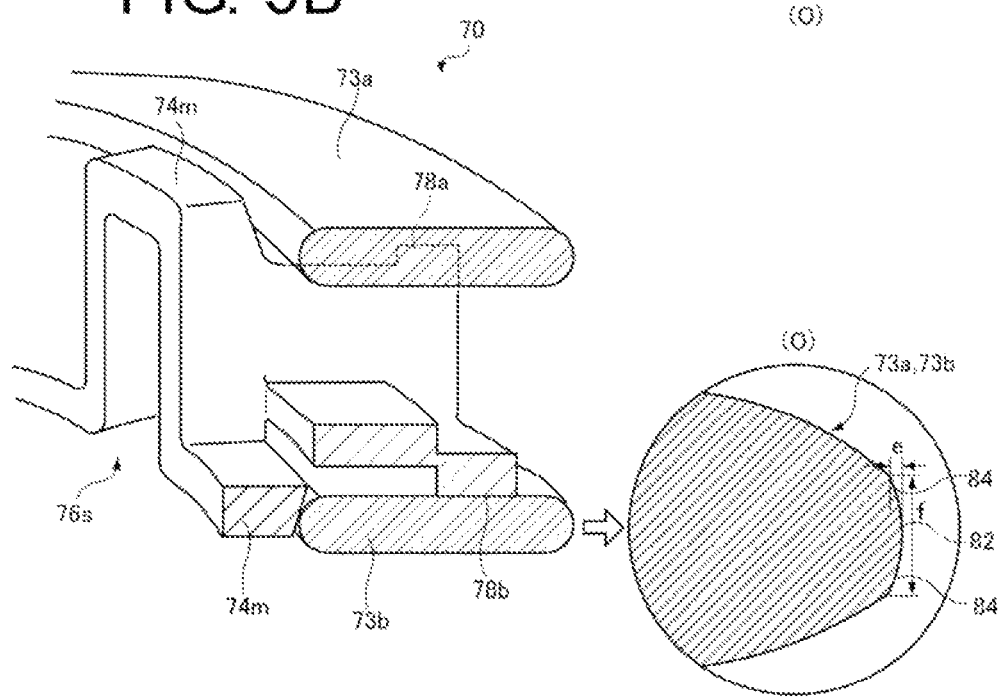
FIG. 5B is a cross-sectional view illustrating a 3-piece type oil ring.

Note that the oil ring 70 is not limited to the 2-piece type, but may also be, for example, a 3-piece type oil ring 70 as illustrated in FIG. 5B. The oil ring 70 has annular side rails 73a, 73b which are vertically separated and a spacer expander 76s interposed between the side rails 73a, 73b.

The spacer expander 76s is formed by plastically processing a steel material into a waveform that has bumps and dips repeated in the cylinder axial direction. With the help of the waveform, an upper support surface 78a and a lower support surface 78b are formed, so that the pair of side rails 73a, 73b are each supported in the axial direction. On the inner circumferential end of the spacer expander 76s, an ear 74m which is erected in an arch shape outwardly in the axial direction is provided. The ear 74m is brought into contact with the inner circumferential surface of the side rails 73a, 73b. Note that the spacer expander 76s is incorporated into a ring groove of the piston 30 using gaps while being shrunk in the circumferential direction. As a result, the resilience of the spacer expander 76s causes the ear 74m to bias the side rails 73a, 73b under pressure radially outwardly.

As further shown in an enlarged region O of FIG. 5B, both outer edges in the cylinder axial direction of the outer circumferential surface 82 of each of the side rails 73a, 73b have the inclined surfaces 84, 84 which are capable of being in contact with the inner wall surface 12 while being inclined away from the inner wall surface 12 outwardly in the cylinder axial direction. The inclined surfaces 84, 84, which have a so-called sagging shape, are formed by a break-in operation of the piston 30 and the piston rings 40 being performed and the resulting contact wear therebetween. The maximum distance e of the inclined surfaces 84, 84 from the inner wall surface 12 is set to $\frac{1}{2000}$ to $\frac{1}{500}$ the actual contact width f of the outer circumferential surface 82, and more preferably to $\frac{1}{1500}$ to $\frac{1}{500}$. In this embodiment, it is about $\frac{1}{1000}$. Note that the actual contact width f is preferably formed to be 0.02 mm to 0.18 mm.

Frictional Mode of Cylinder Liner and Piston Rings

A description will next be given of the frictional mode of the cylinder liner and the piston rings. As expressed as the Stribeck diagram illustrated in FIG. 6, the friction at the time of typical sliding may be divided into three modes: a frictional mode in a solid-state contact region 110 to slide in direct contact; a frictional mode in a boundary contact region 112 to slide via an oily film; and a frictional mode in a fluid lubrication region 114 to slide via a viscous lubrication oil film. Note that in the Stribeck diagram, the horizontal axis represents "the kinematic viscosity (coefficient of kinematic viscosity) $\mu$"×"the speed U"/"the contact weight W" plotted in a log scale, and the vertical axis represents the friction coefficient ($\mu$). Thus, the minimum frictional force is achieved in the fluid lubrication region 114, so that effective use of the region 114 contributes to reduction in friction, that is, improvement in fuel efficiency. On the other hand, in the case where no transition can be made from some midpoint of the boundary contact region 112 to the fluid lubrication region 114 even when the speed U is increased, as illustrated in a dotted line, the boundary contact region 112 continues to the high-speed region with no change made (or the mixture state with the fluid lubrication region 114).

In this regard, most of the frictional force in the fluid lubrication region 114 is oil shear resistance, where the shear resistance is defined by (viscosity)×(speed)×(area)/(oil film thickness). As a result, reducing the shear area is directly connected to reduction in frictional force.

In this context, in this embodiment, the outer circumferential surface 42 of the piston rings 40 is formed in a barrel shape, of which inclined surface is used to actively flow an oil onto the actual contact surface, thereby quickly transitioning to the fluid lubrication region 114 and achieving reduction in friction. At the same time, the so-called dimple liner technique is applied to the cylinder liner 10 to thereby form the recesses 14 in the stroke center region 20 of the cylinder liner 10 and reduce the substantial area in which oil shear resistance occurs, thus reducing the frictional force more efficiently. In this regard, recent piston rings employ the principle as mainstream that reduction in friction is achieved in the boundary contact region 112, without forming the sagging shape, by extremely reducing the actual contact width of the outer circumferential surface of the piston rings (i.e., employing a V-shaped cross section), decreasing the contact weight W (reducing tension), and increasing the surface hardness (wear resistance).

A description will next be given of the frictional mode of the cylinder liner 10 and the piston rings 40 and so on. Note that since the positions at which the top ring 50, the second ring 60, and the oil ring 70 are secured to the piston 30 are relatively different in the cylinder axial direction, the frictional states of the respective piston rings with the cylinder liner 10 are slightly different from each other in a strict sense. However, the frictional mode of the second ring 60 will be described here, and a description will not be given of the frictional modes of the top ring 50 and the oil ring 70 that can be grasped on the analogy of the frictional mode of the second ring 60. Note that only a fastest speed passed point C is based on the top ring 50.

Frictional Mode of Cylinder Liner Having No Recesses and Piston Rings

The Stribeck diagram drawn by a dotted line (Base liner) in FIG. 7A is the frictional mode, which was actually measured by the inventors, between the cylinder liner 10 with no recesses 14 formed in both the stroke center region 20 and the outside region 25 (the entire inner wall surface), and the fluid lubrication region 114 of the piston rings 40. Note that the horizontal axis of the Stribeck diagram represents "the kinematic viscosity (coefficient of kinematic viscosity) μ"×"the speed U"/"the contact weight W" not in a logarithmic scale but in real number, while the vertical axis represents the friction coefficient (μ). Since "the kinematic viscosity (coefficient of kinematic viscosity) μ" and "the contact weight W" are the constants that are generally fixed by the specification of the cylinder liner 10 and the piston rings 40, variations in the friction coefficient (μ) of the cylinder liner 10 and the piston rings 40 depend on the relative speed therebetween when the piston 30 slides from the top dead center T to the bottom dead center U of the cylinder liner 10. This relative speed is determined uniquely by the number of rotations per minute (rpm) of the engine. Thus, as illustrated by a stroke line 214 added along the dotted line (Base liner) and in FIG. 7B, in the course in which the piston 30 is moved from the top dead center T past the fastest speed passed point C to the bottom dead center U, the relative speed U between the piston rings 40 and the cylinder liner 10 changes from zero to the highest speed and then returns to zero, and meanwhile, the friction coefficient is varied at all times. Note that the fastest speed passed point C at which the travel speed of the piston 30 in the piston crank mechanism is the highest speed is not at the center of the reciprocating step but at a location that is slightly shifted from the center toward the top dead center T. Note that the region Q in the Stribeck diagram in FIG. 7 onward shows an example of the coverage of the location at which the piston rings 40 travel at the fastest speed (i.e., the right end of the stroke line 214 that transitions in the graph) in an RPM region equal to or greater than the RPM for idling operation.

Figure 8A:
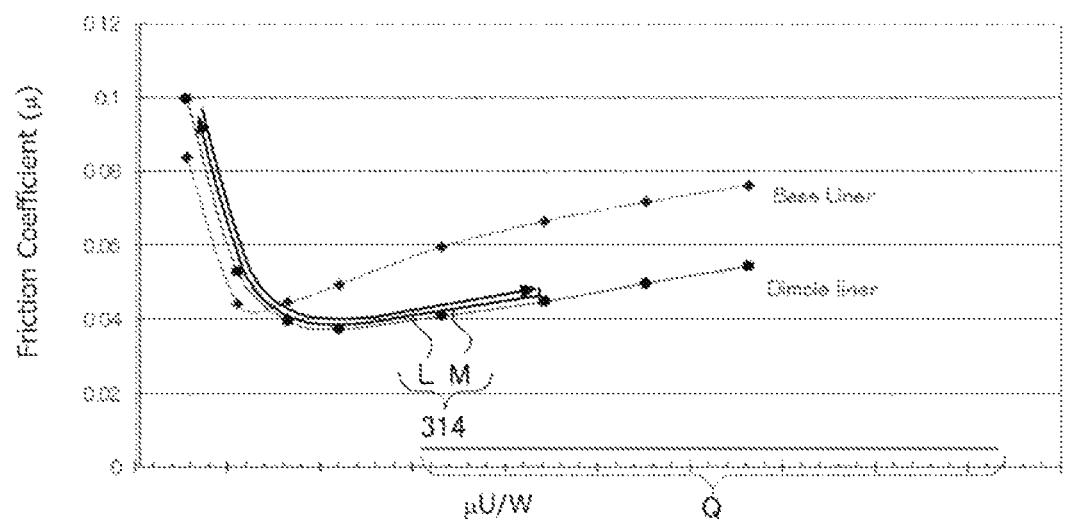
FIG. 8A is a Stribeck diagram for describing a sliding structure for an internal combustion engine of this embodiment.
Figure 8B:
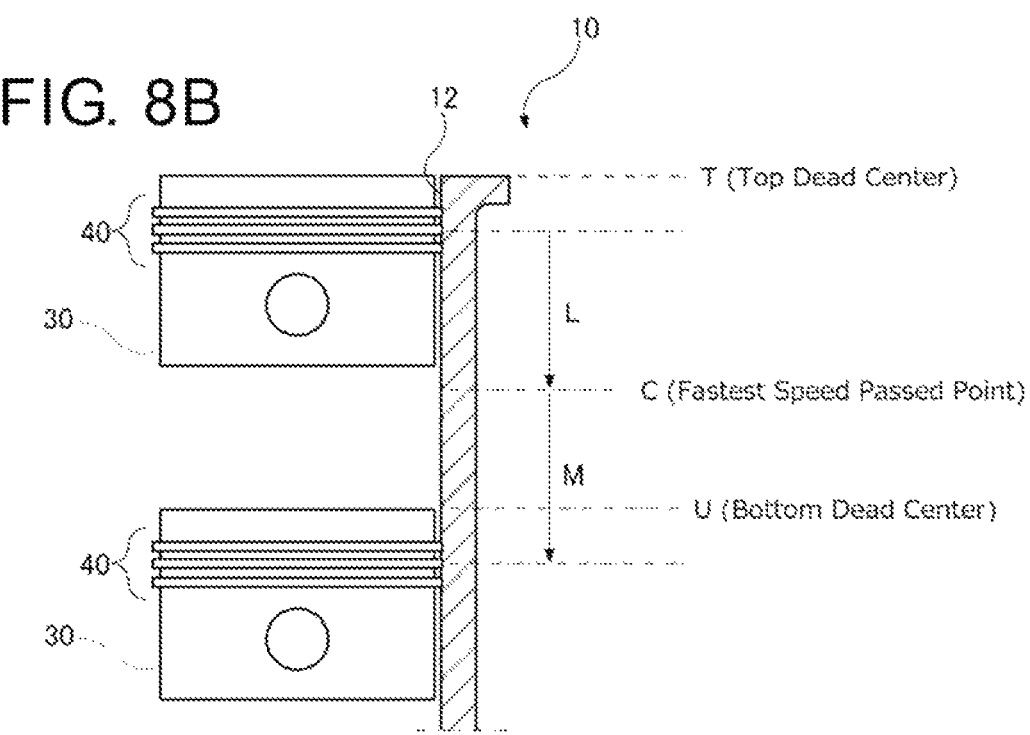
FIG. 8B is a side view illustrating a sliding stroke between a cylinder liner and piston rings.

Frictional Mode Between Cylinder Liner Having Recesses in its Entirety and Piston Rings The Stribeck diagram of a solid line (Dimple liner) in FIG. 8A shows a frictional mode in the fluid lubrication region 114 between the cylinder liner 10 with the recesses 14 formed in both the stroke center region 20 and the outside region 25 (the entire inner wall surface) and the piston rings 40. When the piston 30 slides from the top dead center T of the cylinder liner 10 to the bottom dead center U, variations in the friction coefficient (μ) between the cylinder liner 10 and the piston rings 40 depend on the relative speed therebetween. The relative speed is uniquely determined by the number of rotations per minute (rpm) of the engine. Thus, as shown by a stroke line 314 added along a solid line (Dimple liner) and in FIG. 8B, in the course where the piston 30 slides from the top dead center T of the cylinder liner 10 to the bottom dead center U, the relative speed U between the cylinder liner 10 and the piston rings 40 reaches the highest speed from zero and then returns to zero, and meanwhile, the friction coefficient varies at all times. Here, it can be seen that when compared with the Stribeck diagram of the dotted line (Base liner), the Stribeck diagram of the solid line (Dimple liner) is offset rightward (toward higher speeds) and also offset downwardly (toward lower frictions). In particular, higher-speed regions cause greater differences in friction coefficient between the solid line (Dimple liner) and the dotted line (Base liner).

Sliding Structure of Cylinder Liner and Piston Rings of this Embodiment

Figure 9A:
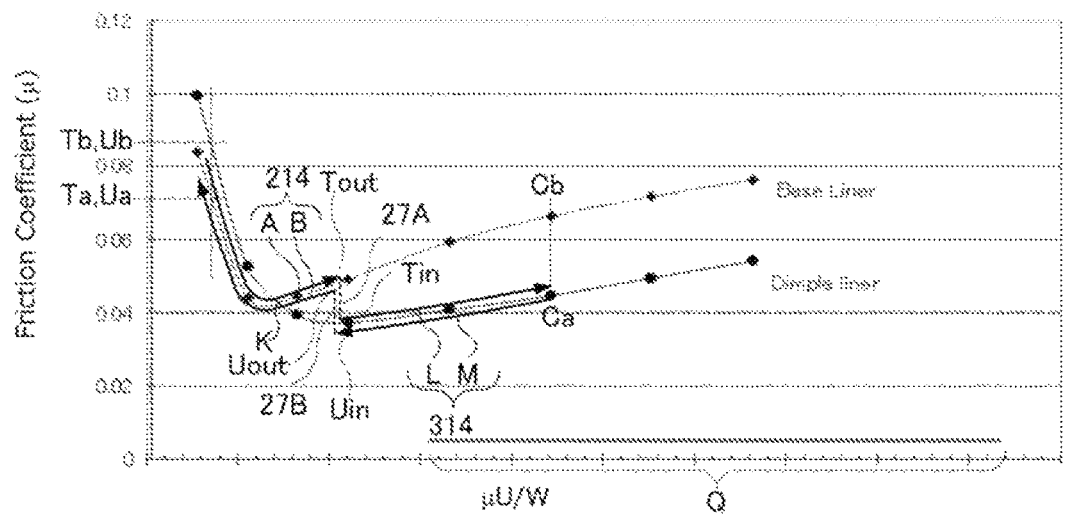
FIG. 9A is a Stribeck diagram for describing a sliding structure for an internal combustion engine of this embodiment.
Figure 10A:
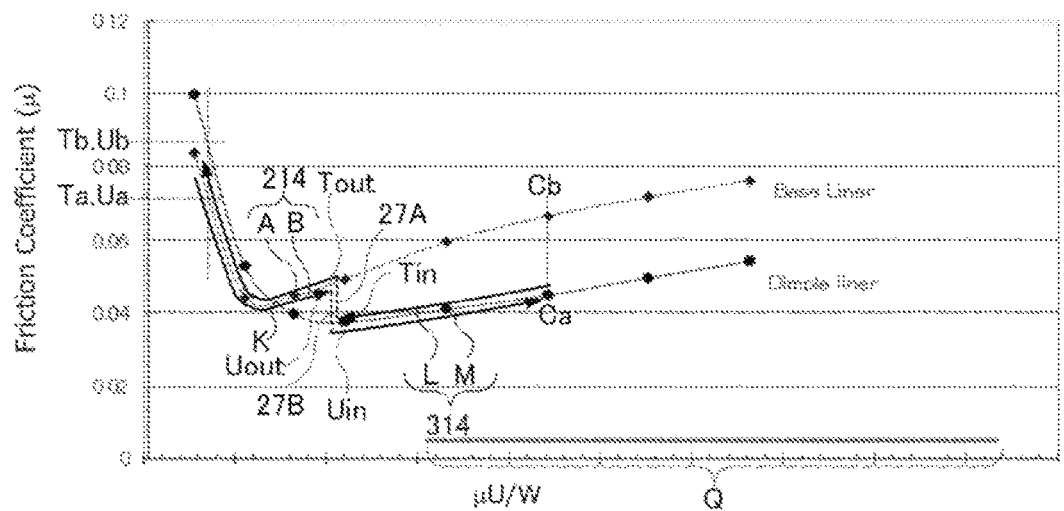
FIG. 10A is a Stribeck diagram for describing a sliding structure for an internal combustion engine of this embodiment.

It can be judged that the frictional mode between the cylinder liner 10 having the recesses 14 only in the stroke center region 20 described in FIG. 1 and the piston rings 40 should be the combination of the stroke line 214 of the dotted line (Base liner) in FIG. 7A and the stroke line 314 of the solid line (Dimple liner) in FIG. 8A. This state is shown in FIG. 9A and FIG. 10A. That is, as illustrated in FIG. 9A, during the progress of relative movement of the piston rings 40 from the top dead center T toward the bottom dead center U through the outside region 25 of the cylinder liner 10, the stroke line 214 (A and B) along the dotted line (Base liner) is followed, whereas during the progress of relative movement of the piston rings 40 through the stroke center region 20 of the cylinder liner 10, the stroke line 314 (L and M) along the solid line (Dimple liner) is followed. Furthermore, as illustrated in FIG. 10A, during the progress of relative movement of the piston rings 40 from the bottom dead center U toward the top dead center T through the outside region 25 of the cylinder liner 10, the stroke line 214 (A and B) along the dotted line (Base liner) is followed, whereas during the progress of relative movement of the piston rings 40 through the stroke center region 20 of the cylinder liner 10, the stroke line 314 (L and M) along the solid line (Dimple liner) is followed.

Furthermore, in the sliding structure of this embodiment, at any RPM equal to or greater than the RPM for an idling operation (which is defined here as the RPM at the idling), the friction coefficient Ca between the inner wall surface 12 and the outer circumferential surface 42 (hereafter to be referred to as the center friction coefficient Ca) at the place in the stroke center region 20 at which the piston rings 40 pass at the highest speed (the fastest speed passed point C in the entire stroke) is less than a center friction coefficient Cb at the same timing (at the fastest speed passed point C) when it is assumed that no recesses are formed in the stroke center region. Furthermore, at the same RPM (here, at the RPM for the idling operation), friction coefficients Ta (on the side of the top dead center) and Ua (on the side of the bottom dead center) (hereafter, the outside friction coefficients Ta, Ua) between the inner wall surface 12 and the outer circumferential surface 42 when the piston rings 40 pass through any place of the outside region 25 outside the stroke center region 20 are so set as to be less than outside friction coefficients Tb, Ub at the same timing when a plurality of recesses are formed in the outside region 25.

This arrangement makes it possible to provide a sliding structure in which friction can be reduced in the absence of the recesses 14 by exploiting the outside region 25 with no recesses in lower-speed regions, and meanwhile, friction can be reduced in the presence of the recesses 14 by exploiting the stroke center region 20 with the recesses 14 in higher-speed regions, thus providing advantages to both the cases at the same time.

Figure 9B:
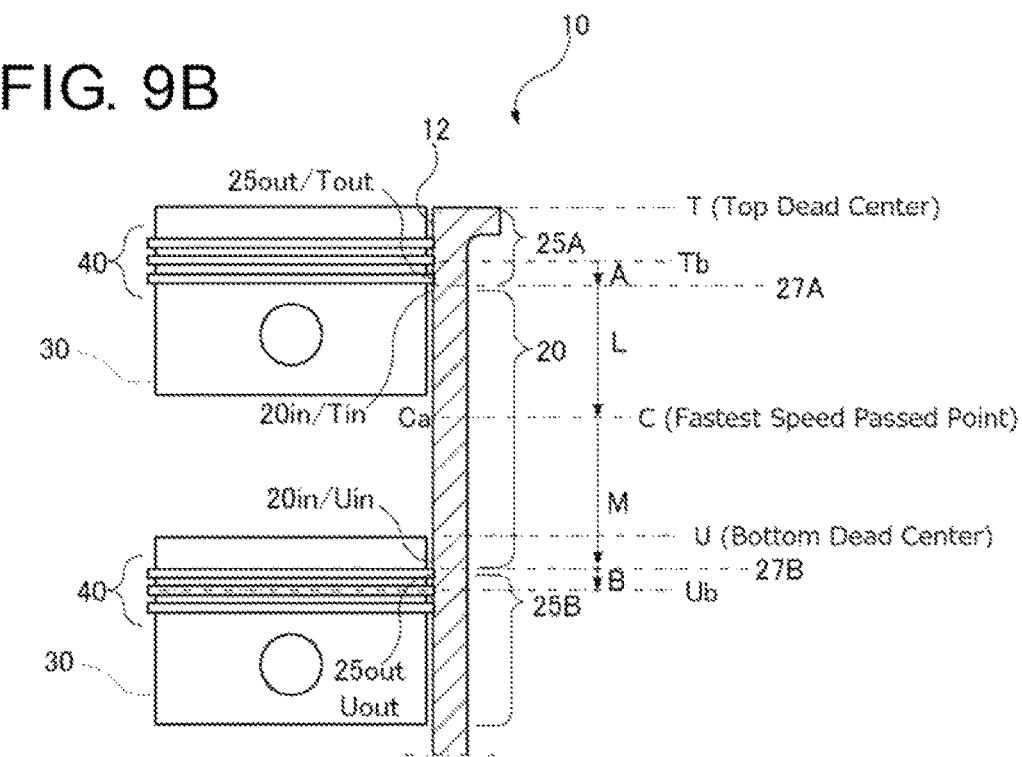
FIG. 9B is a side view illustrating a sliding stroke between a cylinder liner and piston rings.
Figure 10B:
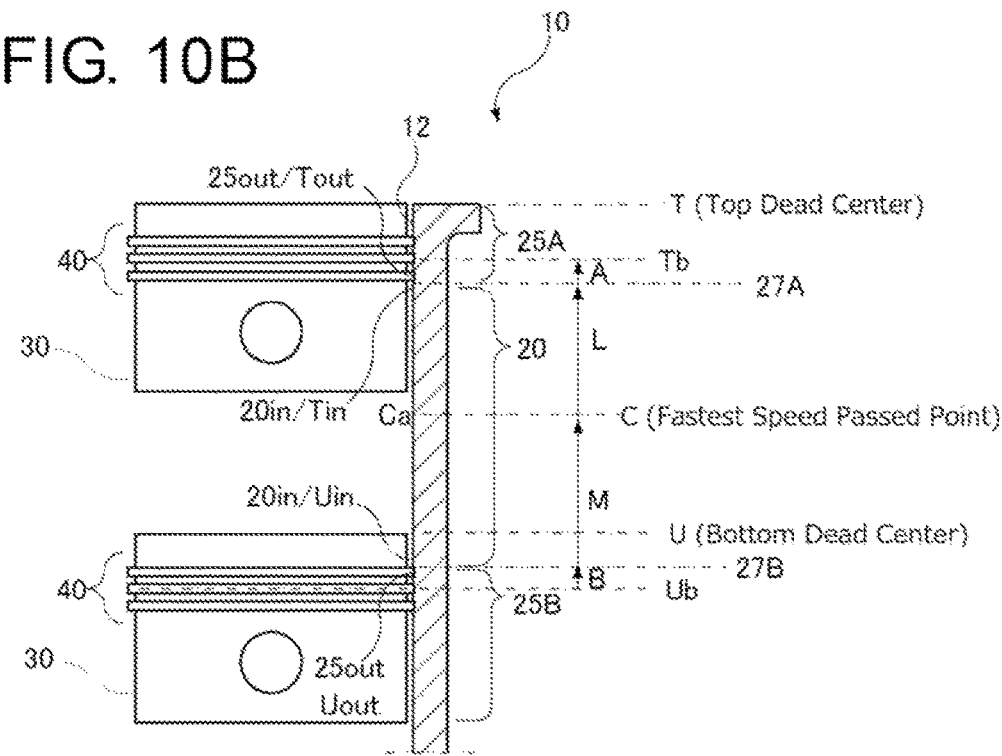
FIG. 10B is a side view illustrating a sliding stroke between a cylinder liner and piston rings.

Furthermore, in this embodiment, as illustrated in FIG. 9B and FIG. 10B, friction coefficients Tin (on the side of the top dead center) and Uin (on the side of the bottom dead center) (hereafter, both to be referred to as the boundary center side friction coefficient) when the piston rings 40 pass through an adjacent region 20 in on the side of the stroke center region 20 adjacent to the boundary (the upper boundary 27A, the lower boundary 27B) between the stroke center region 20 and the outside region 25 are set to be less than friction coefficients Tout (on the side of the top dead center) and Uout (on the side of the bottom dead center) (hereafter, both to be referred to as the boundary outside friction coefficient) when the piston rings 40 pass through an adjacent region 25 out closer to the outside region 25 adjacent to the boundary. That is, as illustrated in FIG. 9A and FIG. 10A, within the range of the rightward side (on the side of the higher-speed region) with reference to a point K (hereafter to be referred to as the friction transition point K) at which the Stribeck diagram of the solid line (Dimple liner) and the Stribeck diagram of the dotted line (Base liner) intersect, friction coefficients are to be shifted by passing through the boundaries 27A, 27B between the stroke center region 20 and the outside region 25.

This is done because the friction coefficient increases abruptly in the lower-speed region with respect to the friction transition point K of the Stribeck diagram of the solid line (Dimple liner), and thus, passing through the boundaries 27A, 27B in that region would exploit the lower-speed region (the higher friction coefficient region) of the Stribeck diagram of the solid line (Dimple liner), thus making fuel efficiency only the worse.

Furthermore, in this embodiment, at any RPM equal to or greater than the RPM for the idling operation (which is defined here as the RPM at the idling), variation ratios (Tout/Tin), (Uout/Uin) of the boundary outside friction coefficients Tout, Uout to the boundary center side friction coefficients Tin, Uin at the time of a shift between the boundaries are set to be within the range of 2.5 or less, and more desirably 1.5 or less. This arrangement makes it possible to pass through the boundaries 27A, 27B while the boundary outside friction coefficients Tout, Uout and the boundary center side friction coefficients Tin, Uin are brought as close to each other as possible, thereby preventing abrupt changes in friction coefficient. As a result, smoother engine rotations can be achieved. Note that in this embodiment, as illustrated in the Stribeck diagram of the dotted line (Base liner), since it is inefficient to exploit the higher-speed range in which the outside friction coefficients Tout, Uout are excessively increased, at least one of the boundary outside friction coefficients Tout, Uout is set to be 0.06 or less in this embodiment.

Controlling Engine RPM at the Idling Operation of Internal Combustion Engine of this Embodiment A description will next be given of controlling the engine RPM at the idling operation of the internal combustion engine. For the internal combustion engine illustrated in this embodiment, since frictional modes may vary depending on the travel speed of the piston rings 40, the setting of the travel speed of the piston rings 40 at the idling operation significantly influences, for example, fuel efficiency.

Figure 11A:
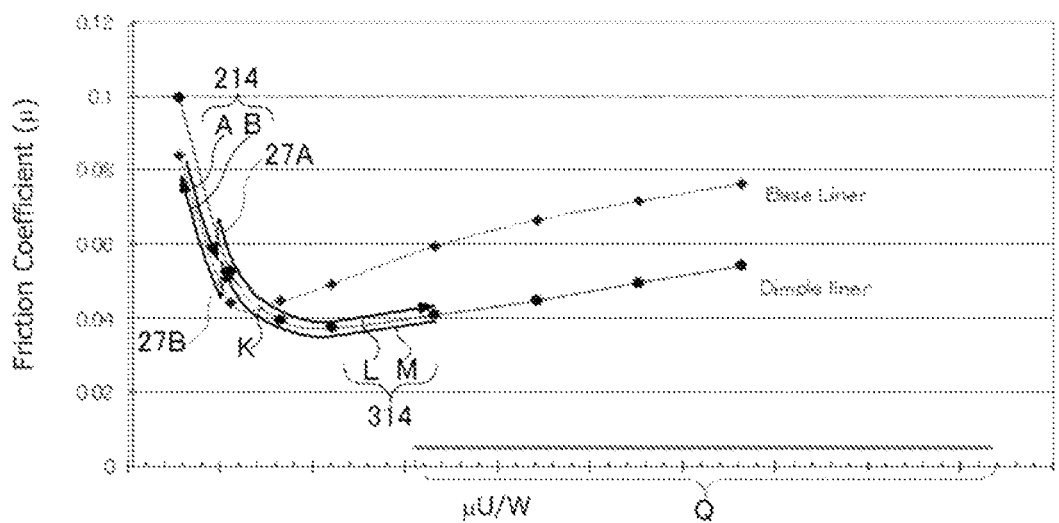
FIGS. 11A and 11B are each a Stribeck diagram for describing the operation control of an internal combustion engine of this embodiment.
Figure 11B:
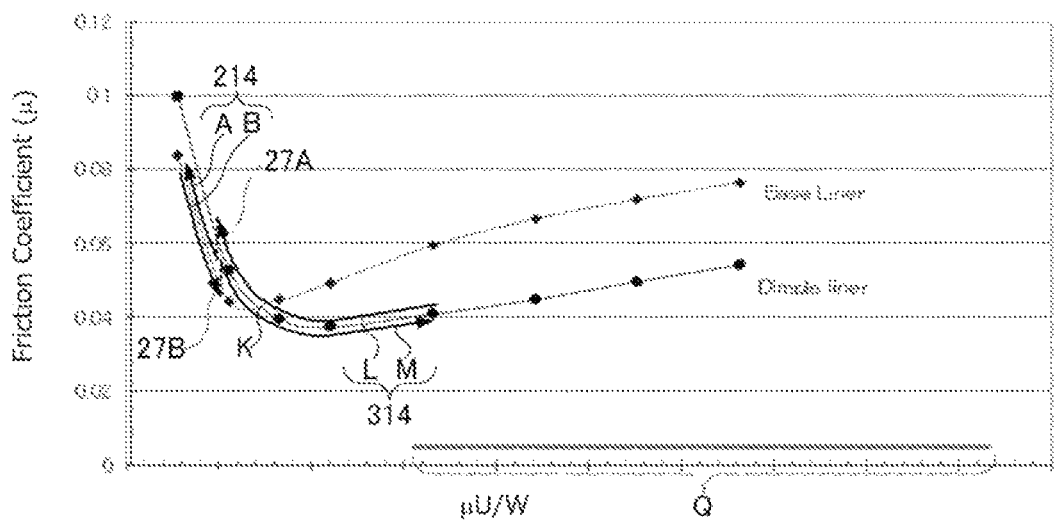

For example, as illustrated in FIGS. 11A and 11B, setting the engine RPM at the idling operation to lower ones causes the piston rings 40 to pass through the boundaries 27A, 27B in a lower-speed region with respect to the friction transition point K. As a result, between the boundaries 27A, 27B and the friction transition point K, the presence of the stroke center region 20 would make the friction coefficient only the worse (see the Stribeck diagram of the solid line (Dimple liner)).

Figure 12A:
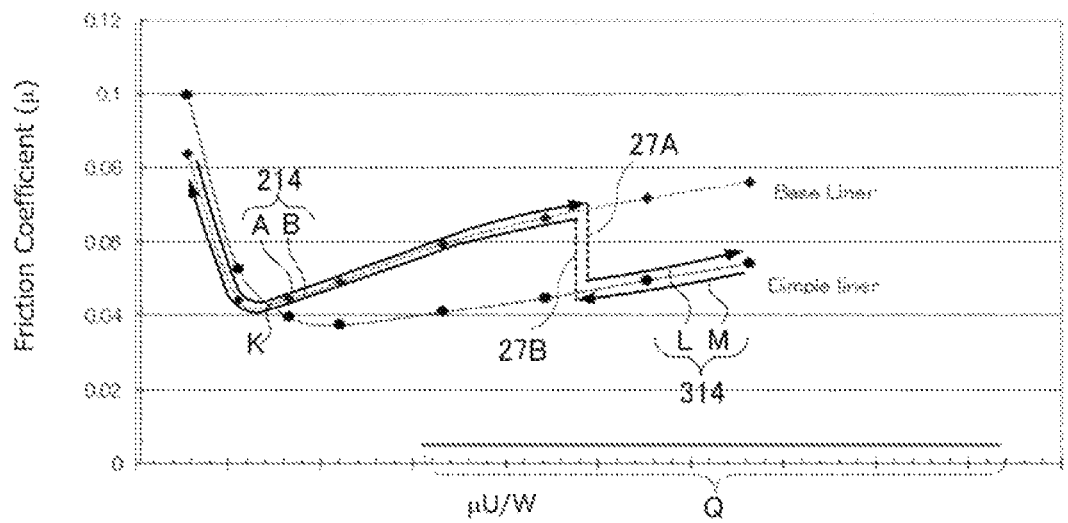
FIGS. 12A and 12B are each a Stribeck diagram for describing the operation control of an internal combustion engine of this embodiment.
Figure 12B:
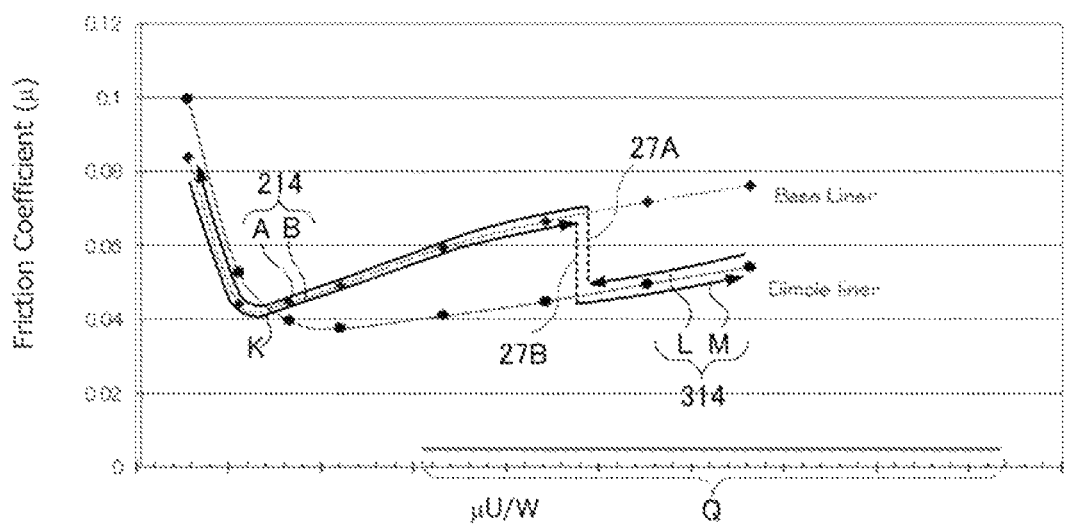

On the other hand, as illustrated in FIGS. 12A and 12B, at a higher engine RPM at the idling operation as compared with the state of FIG. 11, the timing at which the piston rings 40 pass through the boundaries 27A, 27B is shifted toward a higher-speed region with respect to the friction transition point K, thereby eliminating the adverse effects of the stroke center region 20 illustrated in FIG. 11. However, in turn, a higher friction coefficient of the outside region 25 in a higher-speed side relative to the friction transition point K starts to exert adverse effects (see the Stribeck diagram of the dotted line (Base liner)). Note that although FIGS. 12A and 12B still show appropriate ranges, a much higher RPM at the idling operation would cause the timing of passing through the boundaries 27A, 27B to be shifted to a much higher speed side, with the result that the variation ratios (Tout/Tin), (Uout/Uin) of friction coefficients at the time of a boundary shift may exceed 2.5. This will lead to an excessive change in friction coefficient, inhibiting smooth rotations.

In the light of the foregoing, it can be seen that the RPM of the internal combustion engine at the idling operation is preferably set to achieve the sliding structure shown in FIG. 9 and FIG. 10.

Applied Structure of Piston Rings

Figure 13A:
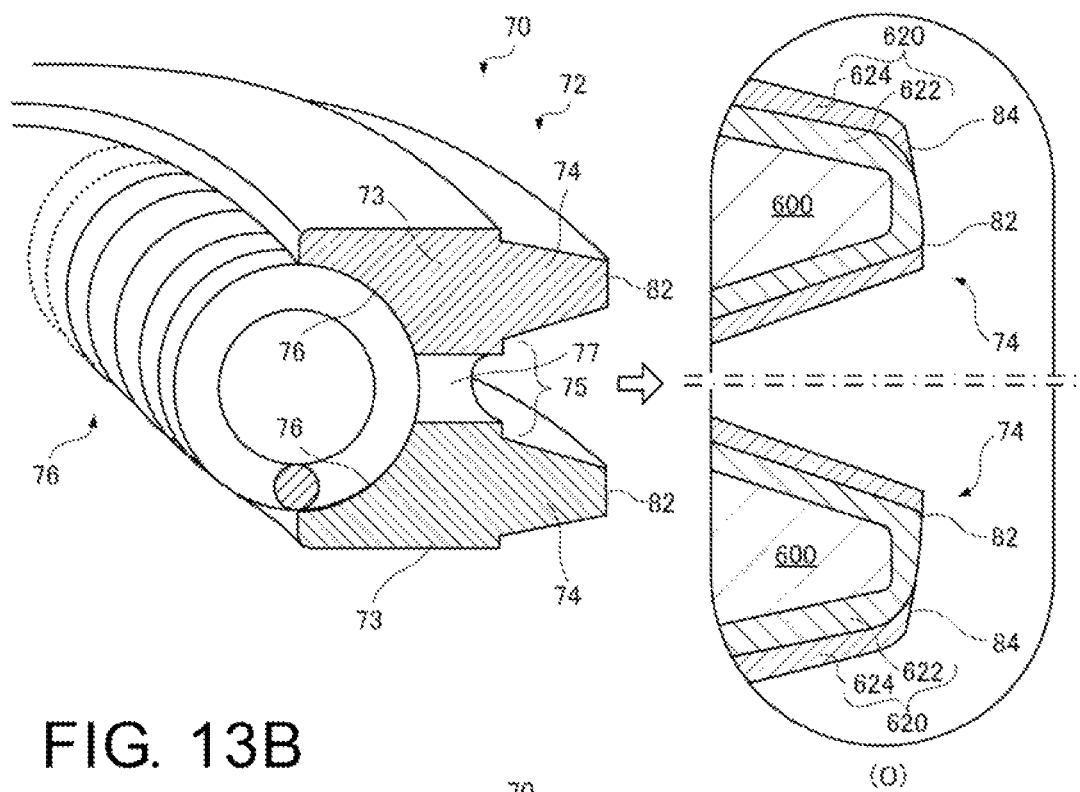
FIG. 13A is a cross-sectional view illustrating a 2-piece type oil ring according to an application example of this embodiment and FIG. 13B is a cross-sectional view illustrating a 3-piece type oil ring.

A description will next be given of applied structures of the 2-piece type oil ring 70 (see FIG. 13A) and the 3-piece type oil ring 70 (see FIG. 13B). As illustrated in FIG. 13A, the pair of rails 73, 73 of the 2-piece type oil ring 70 have a base member 600, and a surface treatment layer 620 formed on the surface of the base member 600. The base member 600 is formed of, for example, a steel material, a cast-iron material, or an aluminum alloy; however, the material is not limited to a particular one as long as the one provides a good wear resistance. Examples of desirable steel materials may include a steel material having a C content of 0.16 to 1.30%, and a chrome steel containing a trace amount of at least any one of Mo and V.

The surface treatment layer 620 is provided with a hard first layer 622, and a second layer 624 that is softer than the first layer 622. The first layer 622 preferably has a Vickers hardness of, for example, HV800 or greater. More specifically, employed is a hard carbon film (DLC) or a hard chromium plating. Furthermore, the first layer 622 may be a PVD film formed of a nitride layer and/or Cr—N or Cr—B—N by physical vapor deposition (PVD) such as ion plating or sputtering. Alternatively, the first layer 622 may also be subjected to an abrasion resistant surface treatment by nitriding such as thermal spraying or gas nitriding (GN).

Figure 13B:
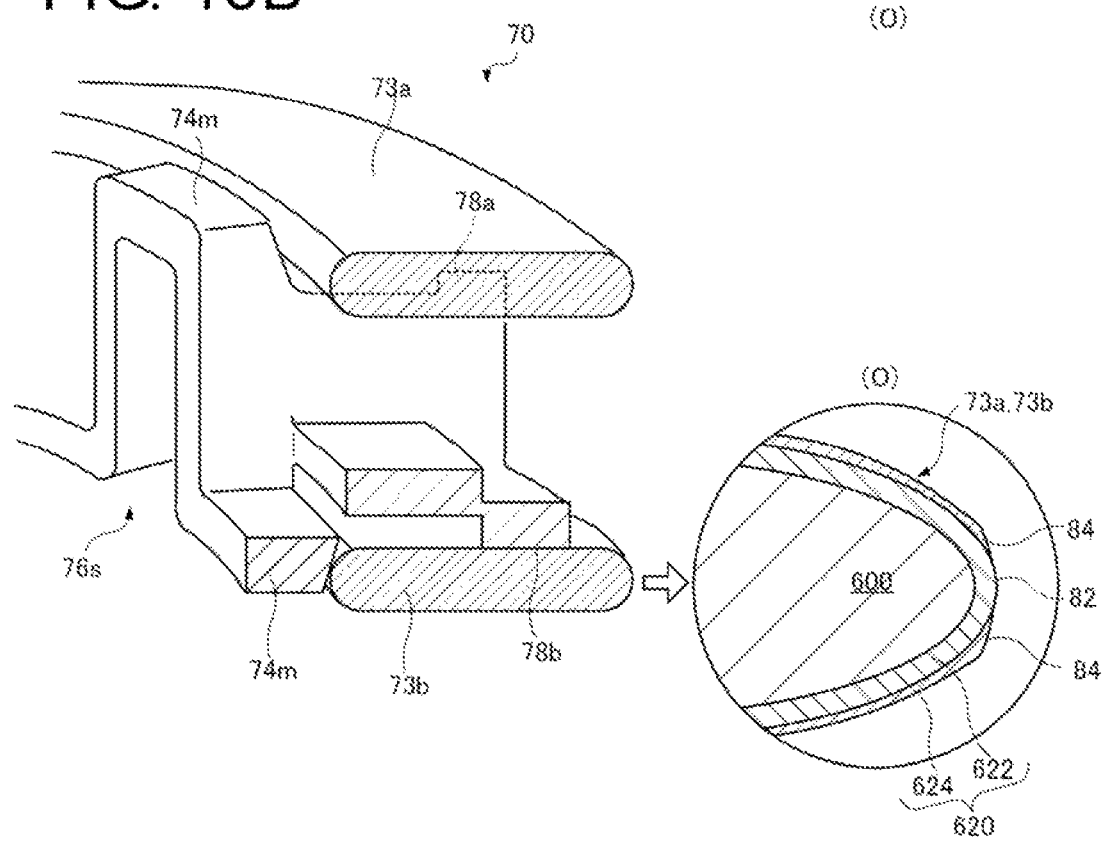

As illustrated in FIG. 13B, the side rails 73a, 73b of the 3-piece type oil ring 70 also have a base member 600 like that of the 2-piece type, and a surface treatment layer 620 formed on the surface of the base member 600. The surface treatment layer 620 is provided with a hard first layer 622, and a second layer 624 that is softer than the first layer 622.

The first layer 622 preferably has a thickness of, when formed as a nitride layer by gas nitriding, 10 to 150 μm for the 2-piece type oil ring 70 and 2 to 50 μm for the 3-piece type oil ring 70. The PVD film by physical vapor deposition (PVD) is preferably 5 to 50 μm for the 2-piece type oil ring 70 and 5 to 30 μm for the 3-piece oil ring.

Furthermore, after the first layer 622 is formed and before the second layer 624 is formed, the surface is preferably subjected to a finish treatment such as lapping, and the surface roughness (Ra) should be desirably 0.7 μm or less, more preferably 0.5 μm or less and 0.05 μm or more. Note that the surface roughness (Ra) means "the arithmetic average roughness".

The second layer 624 is formed of a softer material when compared with the first layer 622 to have, for example, a Vickers altitude of HV800 or less or less than HV800. Specifically, the second layer 624 is preferably formed of chromium (Cr), nickel phosphorus (Ni—P), a synthetic resin such as a polyamide-imide resin, a film of Cr—N or Cr—B—N, and tin (Sn). Furthermore, unlike the first layer 622, the outer surface of the second layer 624 needs not to be subjected to a finish treatment such as lapping.

The second layer 624 serves to be moderately worn at the initial operation of the internal combustion engine (at the break-in operation), and consequently, part of the first layer 622 is exposed to allow the outer circumferential surface 82 to take a barrel shape. On the actual contact surface that constitutes the actual contact width of the outer circumferential surface 82, the exposed first layer 622 mutually smoothly continues to the second layers 624 which remain on both sides of the first layer 622 and which have been worn to be curved in cross section.

In the light of the foregoing, since the presence of the second layers 624 on both sides enables the outer circumferential surface 82 to be formed into an effective barrel shape, the fluid lubrication region required of the sliding structure of this embodiment can be created in between the oil ring 70 and the cylinder liner 10. Note that the thickness of the second layer 624 is formed so that the amount of the sagging of the barrel shape after the break-in operation (the maximum separation from the cylinder liner 10) is a desired amount, specifically to be 10 μm or less, more preferably 0.5 μm to 5.0 μm. A preferable amount of the sagging to be formed may preferably be within the range of 1/1500 to 1/500 the actual contact width f between the oil ring 70 and the cylinder liner 10. Setting the amount of the sagging to the aforementioned range enables creating preferred fluid lubrication between the piston ring and the cylinder liner, and thereby achieves reduced friction.

Note that the 2-piece type or the 3-piece type oil ring 70 may have the base member 600 formed of a 13Cr steel. The 13Cr steel may be composed of 0.6 to 0.7 mass % carbon, 0.25 to 0.5 mass % silicon, 0.20 to 0.50 mass % manganese, 13.0 to 14.0 mass % chromium, 0.2 to 0.4 mass % molybdenum, 0.03 mass % or less phosphorus, 0.03 mass % or less sulfur, balance iron, and unavoidable impurities.

Furthermore, apart from the foregoing, the base member 600 of the oil ring 70 may also be formed of a 17Cr steel. The 17Cr steel may be composed of 0.80 to 0.95 mass % carbon, 0.35 to 0.5 mass % silicon, 0.25 to 0.40 mass % manganese, 17.0 to 18.0 mass % chromium, 1.00 to 1.25 mass % molybdenum, 0.08 to 0.15 mass % vanadium, 0.04 mass % or less phosphorus, 0.04 mass % or less sulfur, balance iron, and unavoidable impurities. As other materials, it is also possible to employ an 8Cr steel, and a material equivalent to SWRH77B.

Note that since the actual contact width is set by including the second layer 624, the actual width at the protruded end of the base member 600 and the first layer 622 may preferably be set to be less than the actual contact width.

Note that shown here by way of example was the case where the oil ring 70 had the base member 600 and the surface treatment layer 620 that was formed on the surface of the base member 600. The likewise surface treatment layer may also be preferably formed for the top ring 50 and the second ring 60.

A description will next be given of a second embodiment of the present invention with reference to the attached drawings. First, the sliding structure for an internal combustion engine according to the embodiment of the present invention will be described in detail.

Cylinder Liner

Figure 15:
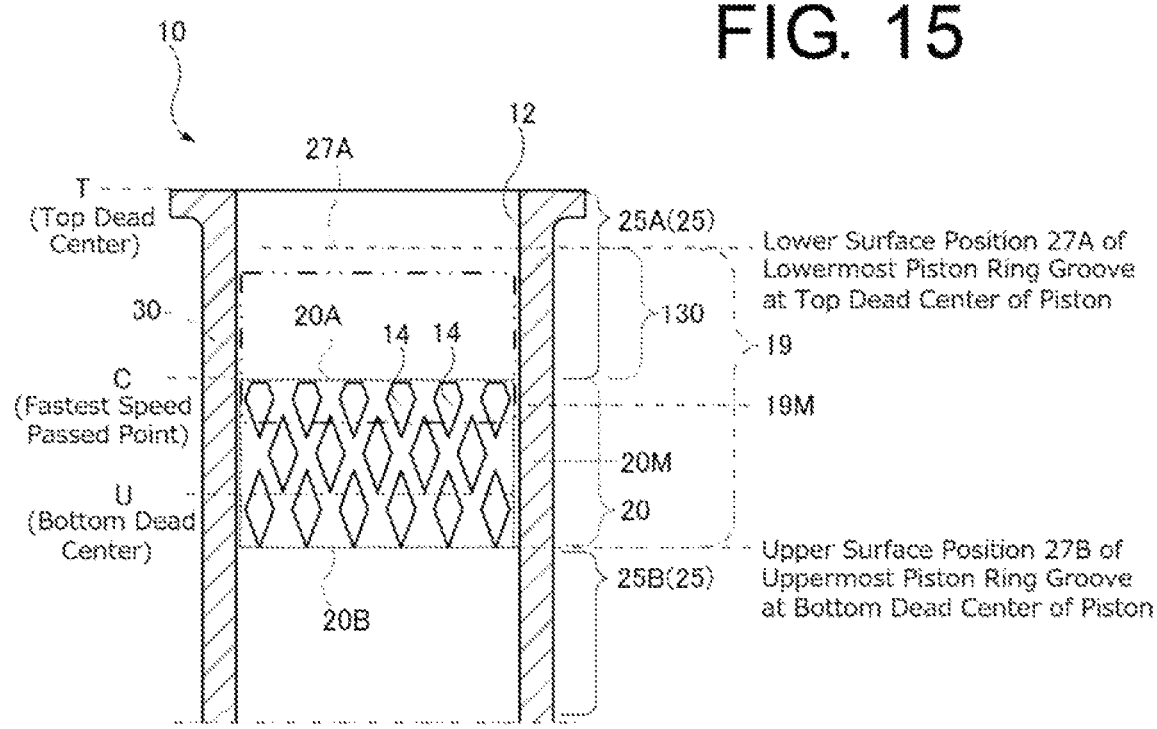
FIG. 15 is a cross-sectional view illustrating a cylinder liner in the axial direction, which is applied to a sliding structure for an internal combustion engine according to a second embodiment of the present invention.

As illustrated in FIG. 15, a plurality of recesses 14 are formed on the inner wall surface 12 of the cylinder liner 10 according to the internal combustion engine of this embodiment. The recesses 14 are formed only in the stroke center region 20 of the inner wall surface 12. The stroke center region 20 serves as part of the entire range (hereafter to be referred to as a reference stroke region 19) from the lower surface position 27A of the ring groove for the lowermost piston ring at the top dead center T of the piston 30 (hereafter to be also referred to as the edge on the side of the top dead center) to the upper surface position 27B of the ring groove for the uppermost piston ring at the bottom dead center U of the piston 30 (hereafter to be also referred to as the edge on the side of the bottom dead center). Among other things, the stroke center region 20 is shifted downward from the edge 27A of the reference stroke region 19 on the side of the top dead center. As a result, there is formed an upper smooth region 130, which is smooth with no recesses, entirely from the edge 27A of the reference stroke region 19 on the side of the top dead center to the edge 20A of the stroke center region 20 on the side of the top dead center.

In this embodiment, the edge 20A of the stroke center region 20 on the side of the top dead center may also be referred to as "an upper boundary 20A" which means the boundary between the place with the recesses 14 formed and the place with no recesses 14 formed. Furthermore, the edge 20B of the stroke center region 20 on the side of the bottom dead center may also be referred to as "a lower boundary 20B" which means the boundary between the place with the recesses 14 formed and the place with no recesses 14 formed. Note that in this embodiment, the edge (lower boundary) 20B of the stroke center region 20 on the side of the bottom dead center coincides with the edge 27B of the reference stroke region 19 on the side of the bottom dead center, but without being necessarily limited thereto, may also be located to be higher or lower than the same.

Furthermore, defining the region outside the stroke center region 20 as the outside region 25, the outside region 25 is configured from the upper outside region 25A adjacent to the stroke center region 20 on the side of the top dead center, and the lower outside region 25B adjacent to the stroke center region 20 on the side of the bottom dead center. Note that the upper outside region 25A includes the upper smooth region 130 as a part thereof.

The piston 30 reciprocates through the cylinder liner 10 by repeatedly passing through the upper outside region 25A (the upper smooth region 130), the stroke center region 20, the lower outside region 25B, the stroke center region 20, and the upper outside region 25A (the upper smooth region 130) in that order.

The distance of the upper smooth region 130 in the stroke direction is desirably set to 30% or greater of the total distance of the reference stroke region 19 in the stroke direction. Furthermore, a center point 20M of the stroke center region 20 in the stroke direction is located on the side of the bottom dead center U of the piston with respect to a center point 19M of the reference stroke region in the stroke direction.

When the position at which the uppermost piston ring (the top ring 50 to be discussed later) passes through the inner wall surface 12 at the highest speed is defined as a fastest speed passed point C, the edge (upper boundary) 20A of the stroke center region 20 on the side of the top dead center is set to be at or below the fastest speed passed point C. In this embodiment, the upper boundary 20A is set to coincide with the fastest speed passed point C.

Significance of Presence of Upper Smooth Region

As already described, this embodiment is provided with the upper smooth region 130, where no recesses are formed, on the side of the top dead center relative to the stroke center region 20. The significance of the upper smooth region 130 is as follows. The piston 30 on the side of the top dead center is subjected to a high-temperature environment because of the presence of the combustion chamber. Thus, if recesses are formed on the cylinder liner 10 on the side of the top dead center allowing the engine oil to reside in the recesses, the engine oil reaches a high temperature and is vaporized, thereby causing an increase in oil consumption. On the other hand, the piston 30 on the side of the top dead center T has the reduced friction coefficient due to the high-temperature environment and the resulting reduced viscosity of the engine oil, so that the necessity of the recesses is less as compared with the region on the side of the bottom dead center U.

Sliding Structure of Cylinder Liner and Piston Rings of this Embodiment

As described with reference to FIG. 15, it can be judged that the frictional mode between the cylinder liner 10, which has the upper smooth region 130 and the stroke center region 20, and the piston rings 40 is a combination of the stroke line 214 of the dotted line (Base liner) in FIG. 7A and the stroke line 314 of the solid line (Dimple liner) in FIG. 8A. This state is shown in FIG. 16A and FIG. 17A.

Figure 16A:
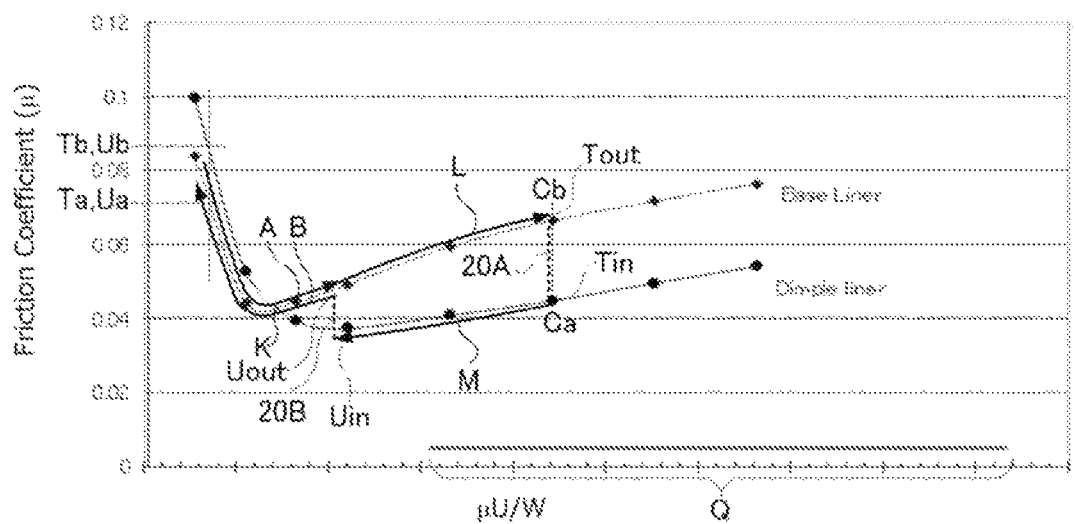
FIG. 16A is a Stribeck diagram for describing a sliding structure for an internal combustion engine of this embodiment.
Figure 16B:
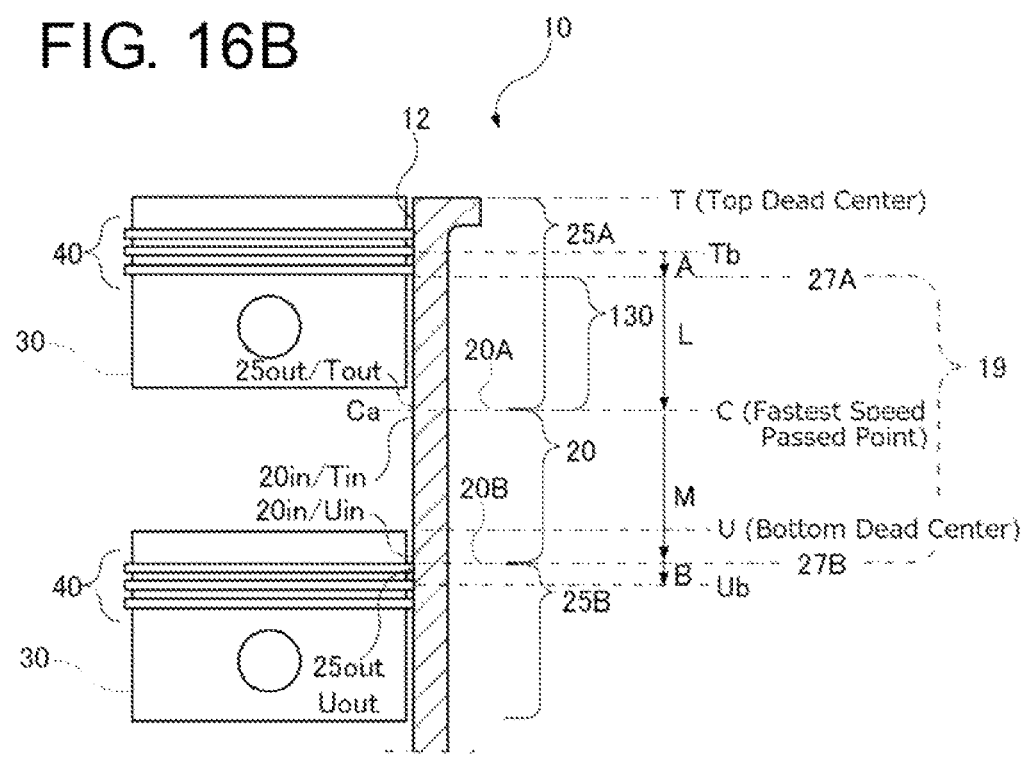
FIG. 16B is a side view illustrating a sliding stroke between a cylinder liner and piston rings.

FIGS. 16A and 16B illustrate the stroke where the piston rings 40 relatively move through the cylinder liner 10 from the top dead center T toward the bottom dead center U. While the piston rings 40 are relatively moving through the upper outside region 25A and the upper smooth region 130 serving as part thereof, the stroke lines A, L are followed along the dotted line (Base liner) in FIG. 16A. Then, while the piston rings 40 pass through the upper smooth region 130 and past the fastest speed passed point C of the cylinder liner 10 to enter the stroke center region 20, through which the piston rings 40 are relatively moving, the stroke line M is followed along the solid line (Dimple liner) in FIG. 16A. Furthermore, while the piston rings 40 having passed through the stroke center region 20 relatively move through the lower outside region 25B of the cylinder liner 10 downwardly toward the bottom dead center, the stroke line B is followed along the dotted line (Base liner) in FIG. 16A.

Figure 17A:
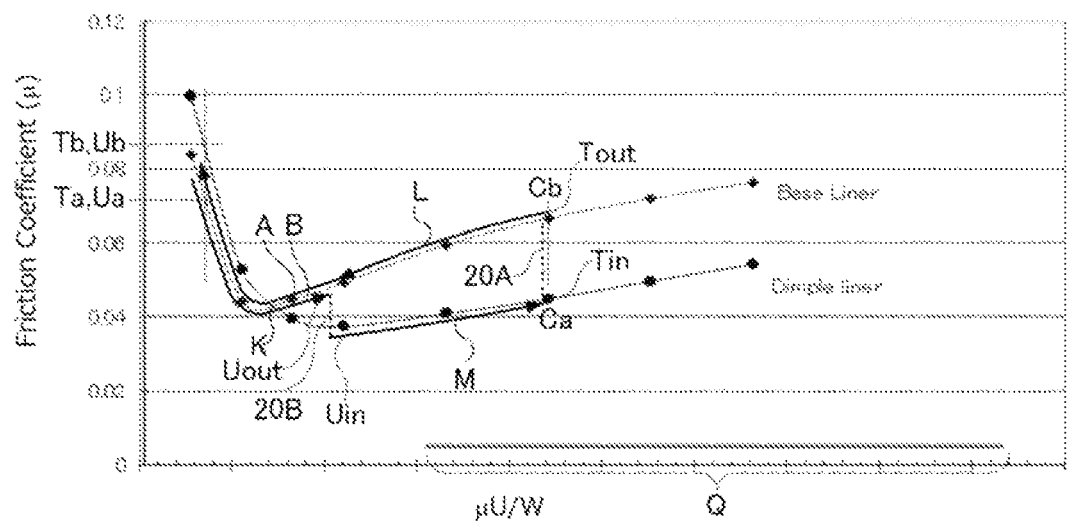
FIG. 17A is a Stribeck diagram for describing a sliding structure for an internal combustion engine of this embodiment.
Figure 17B:
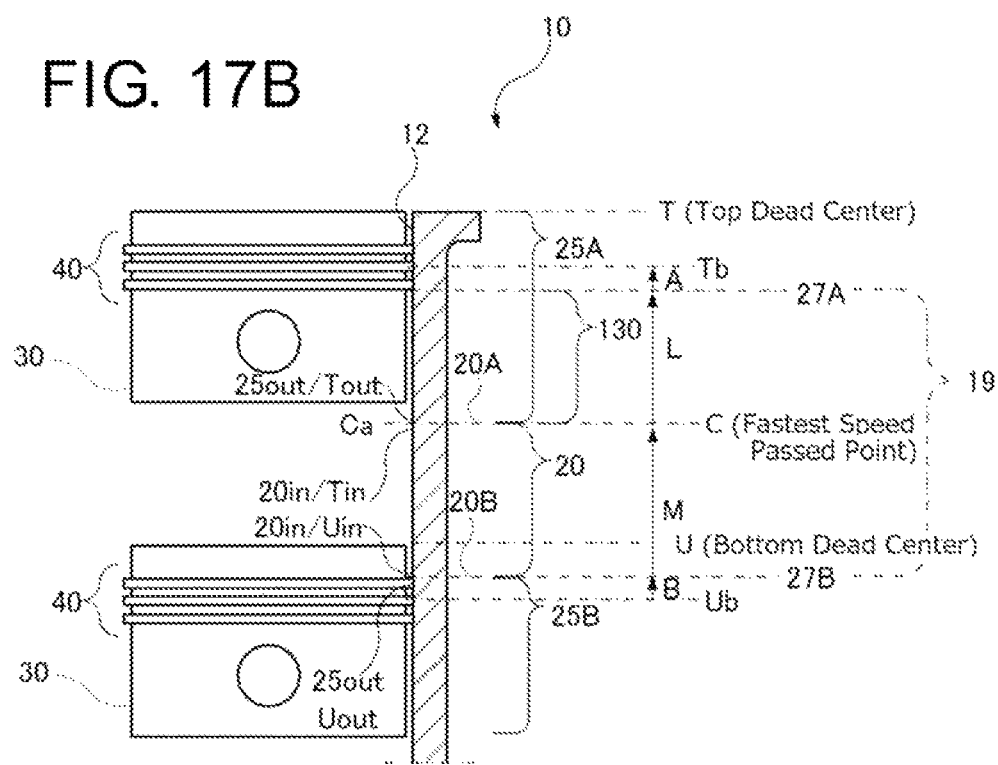
FIG. 17B is a side view illustrating a sliding stroke between a cylinder liner and piston rings.

FIGS. 17A and 17B illustrate the stroke where the piston rings 40 relatively move through the cylinder liner 10 from the bottom dead center U toward the top dead center T. While the piston rings 40 are relatively moving through the lower outside region 25B of the cylinder liner 10 toward the top dead center, the stroke line B is followed along the dotted line (Base liner) in FIG. 17A. Then, while the piston rings 40 pass through the lower outside region 25B to enter the stroke center region 20, through which the piston rings 40 are relatively moving, the stroke line M is followed along the solid line (Dimple liner) of FIG. 17A. While the piston rings 40 having passed through the stroke center region 20 and past the fastest speed passed point C of the cylinder liner 10 are relatively moving through the upper outside region 25A and the upper smooth region 130 serving as part thereof toward the top dead center, the stroke lines L, A are followed along the dotted line (Base liner) in FIG. 17A.

Furthermore, in the sliding structure of this embodiment, at any RPM equal to or greater than the RPM for the idling operation (which is defined here as the RPM at the idling), the friction coefficient Ca between the inner wall surface 12 and the outer circumferential surface 42 (hereafter to be referred to as the center friction coefficient Ca) at the place in the stroke center region 20 through which the piston rings 40 pass at the highest speed (in this embodiment, the upper boundary 20A of the stroke center region 20) is less than the center friction coefficient Cb at the same timing (the timing of passing through the upper boundary 20A) in the case of assuming the state in which no recesses are formed in the stroke center region. Furthermore, at the same RPM (here, at the RPM for the idling operation), the friction coefficients Ta (on the side of the top dead center) and Ua (on the side of the bottom dead center) (hereafter, the outside friction coefficients Ta, Ua) between the inner wall surface 12 and the outer circumferential surface 42 when the piston rings 40 pass through any place of the outside region 25 (the upper outside region 25A or the lower outside region 25B) outside the stroke center region 20 are set to be less than the outside friction coefficients Tb, Ub at the same timing when a plurality of recesses are formed in the outside region 25.

This arrangement makes it possible to provide a sliding structure in which friction can be reduced in the absence of the recesses 14 by exploiting the outside region 25 with no recesses in lower-speed regions, and meanwhile, friction can be reduced in the presence of the recesses 14 by exploiting the stroke center region 20 in higher-speed regions in the presence of the recesses 14, thus providing advantages to both the cases at the same time. Furthermore, while the stroke center region 20 is offset toward the bottom dead center U, the upper smooth region 130 having no recesses formed is located on the side of the top dead center T, thereby reducing oil consumption at the same time.

Furthermore, in this embodiment, as illustrated in FIG. 16B and FIG. 17B, the friction coefficients Tin (on the side of the top dead center) and Uin (on the side of the bottom dead center) (hereafter, both to be referred to as the boundary center side friction coefficient) when the piston rings 40 pass through the adjacent region 20 in on the side of the stroke center region 20 adjacent to the boundaries (the upper boundary 20A, the lower boundary 20B) between the stroke center region 20 and the outside region 25 are set to be less than the friction coefficients Tout (on the side of the top dead center) and Uout (on the side of the bottom dead center)

(hereafter, both to be referred to as the boundary outside friction coefficient) when the piston rings 40 pass through the adjacent region 25 out on the side of the outside region 25 adjacent to the boundaries. That is, as illustrated in FIG. 16A and FIG. 17A, in the right side range (on the side of the higher-speed region) with reference to the point K (hereafter to be referred to as the friction transition point K) at which the Stribeck diagram of the solid line (Dimple liner) and the Stribeck diagram of the dotted line (Base liner) intersect, friction coefficients are to be shifted by passing through the boundaries 20A, 20B between the stroke center region 20 and the outside region 25.

This is done because the friction coefficient increases abruptly in the low-speed region with respect to the friction transition point K of the Stribeck diagram of the solid line (Dimple liner), and thus, passing through the boundaries 20A, 20B in the region would lead to using the lower-speed region (higher friction coefficient region) of the Stribeck diagram of the solid line (Dimple liner), thus making fuel efficiency only the worse.

Furthermore, in this embodiment, at any RPM equal to or greater than the RPM for the idling operation (which is defined here as the RPM at the idling), the variation ratio (Uout/Uin) of the boundary outside friction coefficient Uout at the lower boundary 20B to the boundary center side friction coefficient Uin at the lower boundary 20B at the time of a shift between the boundaries are set to be within the range of 2.5 or less, more desirably 1.5 or less. This arrangement makes it possible to pass through the lower boundary 20B while the boundary outside friction coefficient Uout and the boundary center side friction coefficient Uin are brought as close to each other as possible, thereby preventing abrupt change in friction coefficient. As a result, smoother engine rotations can be achieved. Note that in this embodiment, the boundary outside friction coefficient Uout is set to 0.06 or less.

Control of Engine RPM at the Idling Operation of Internal Combustion Engine of this Embodiment A description will next be given of controlling the engine RPM at the idling operation of an internal combustion engine. For the internal combustion engine shown in this embodiment, the frictional mode changes depending on the travel speed of the piston rings 40, so that at the idling operation, the setting of the travel speed of the piston rings 40 significantly influences, for example, fuel efficiency.

Figure 18A:
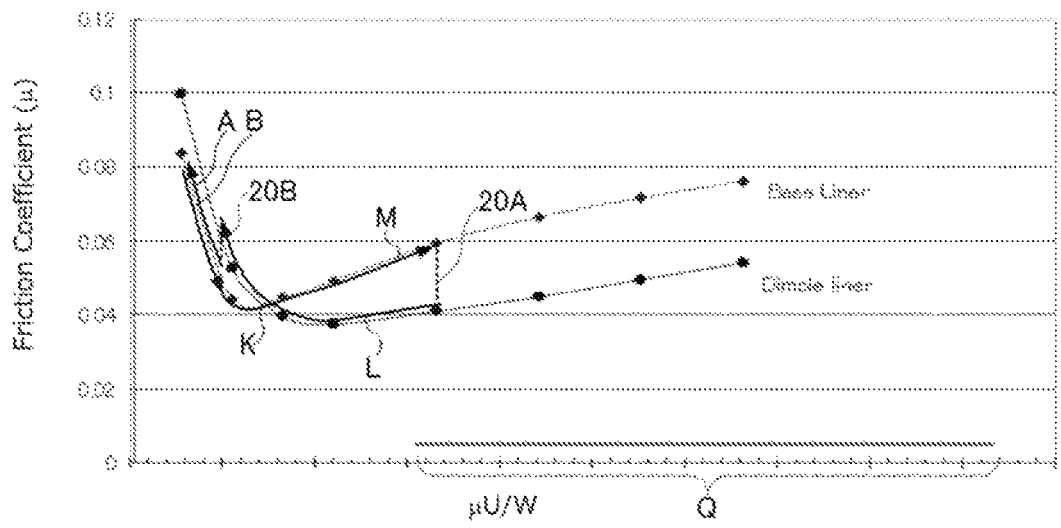
FIGS. 18A and 18B are each a Stribeck diagram for describing the operation control of an internal combustion engine of this embodiment.
Figure 18B:
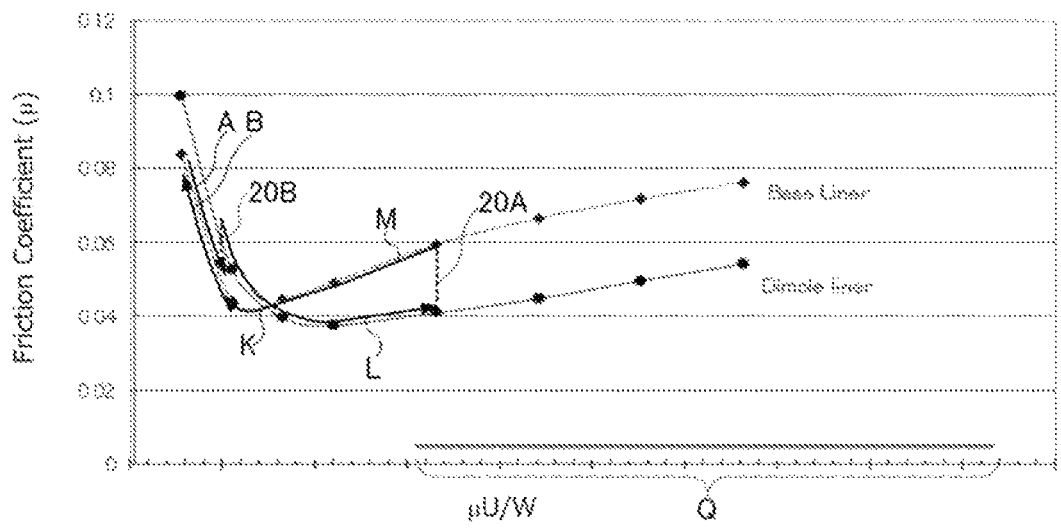

For example, as illustrated in FIGS. 18A and 18B, setting the engine RPM at the idling operation to a lower one would cause the piston rings 40 to pass through the lower boundary 20B in a lower-speed region with respect to the friction transition point K. As a result, between the lower boundary 20B to the friction transition point K, the presence of the stroke center region 20 would make the friction coefficient only the worse (see the stroke line L of the Stribeck diagram of the solid line (Dimple liner)).

Figure 19A:
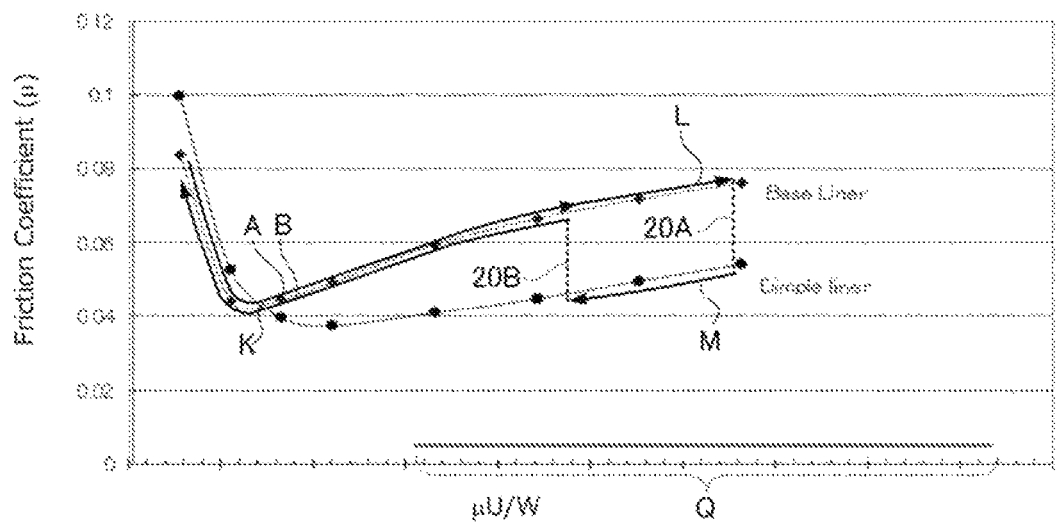
FIGS. 19A and 19B are each a Stribeck diagram for describing the operation control of an internal combustion engine of this embodiment.
Figure 19B:
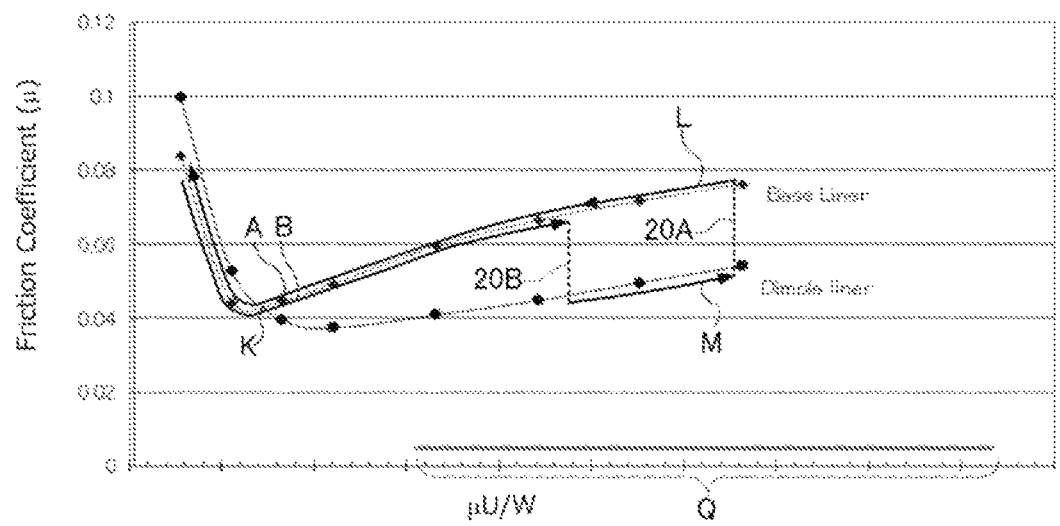

On the other hand, as illustrated in FIGS. 19A and 19B, at a higher engine RPM at the idling operation with respect to the state of FIG. 18, the timing at which the piston rings 40 pass through the lower boundary 20B is shifted to a higher-speed region relative to the friction transition point K, thereby eliminating the adverse effects of the stroke center region 20 illustrated in FIG. 18. However, in turn, a higher friction coefficient of the outside region 25 on a higher-speed side with respect to the friction transition point K starts to exert adverse effects (see the stroke line B of the Stribeck diagram of the dotted line (Base liner)). Note that although FIGS. 19A and 19B still show an appropriate range, a much higher RPM at the idling operation causes the timing of passing through the lower boundary 20B to be shifted toward a much higher speed, with the result that the variation ratio (Uout/Uin) in friction coefficient at the time of a boundary shift may exceed 2.5. This will lead to an excessive change in friction coefficient, inhibiting smooth rotations.

In the light of the foregoing, it can be seen that the RPM of the internal combustion engine at the idling operation is preferably set to achieve the sliding structure shown in FIG. 16 and FIG. 17.

Sliding Structure of Cylinder Liner and Piston Rings According to Modified Example of this Embodiment FIG. 20 and FIG. 21 illustrate a modified example of the sliding structure illustrated in FIG. 16A and FIG. 17A. In this modified example, the range of the upper smooth region 130 is extended further toward the bottom dead center U, with the result that the edge (upper boundary) 20A of the stroke center region 20 on the side of the top dead center is located below the fastest speed passed point C.

Figure 20A:
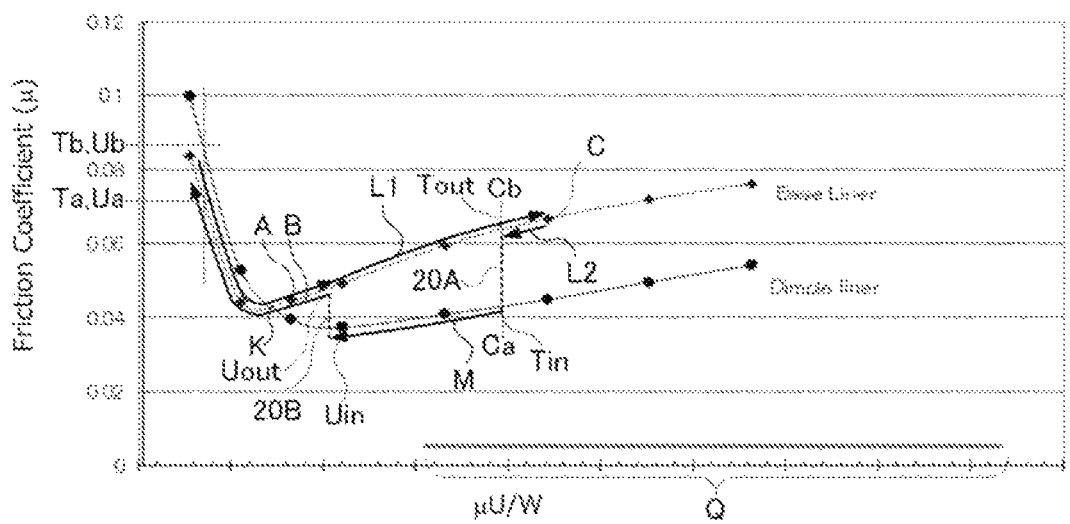
FIGS. 20A and 20B are each a Stribeck diagram for describing the operation control of an internal combustion engine according to a modified example of this embodiment.
Figure 20B:
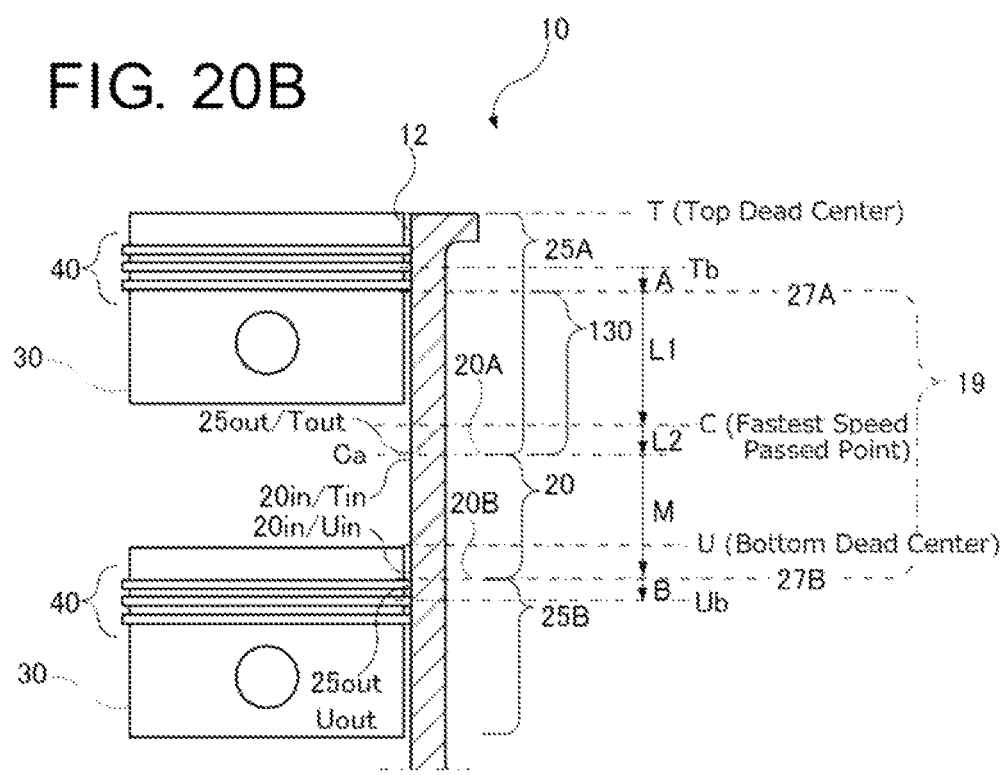

FIGS. 20A and 20B illustrate the stroke in which the piston rings 40 relatively move through the cylinder liner 10 from the top dead center T toward the bottom dead center U. While the piston rings 40 relatively move through the upper outside region 25A and the upper smooth region 130 serving as part thereof, the stroke lines A, L1, L2 are followed along the dotted line (Base liner) in FIG. 20A. Note that as shown in FIG. 20B, since the piston rings 40 travel past the fastest speed passed point C while relatively moving through the upper smooth region 130, the piston rings 40 return at the fastest speed passed point C along the dotted line (Base liner) as illustrated by the stroke lines L1, L2 in FIG. 20A. Then, while the piston rings 40 pass through the upper smooth region 130 to enter the stroke center region 20, through which the piston rings 40 are relatively moving, the stroke line M is followed along the solid line (Dimple liner) of FIG. 20A. Furthermore, while the piston rings 40 having passed through the stroke center region 20 are relatively moving through the lower outside region 25B of the cylinder liner 10 toward the bottom dead center, the stroke line B is followed along the dotted line (Base liner) of FIG. 20A.

Figure 21A:
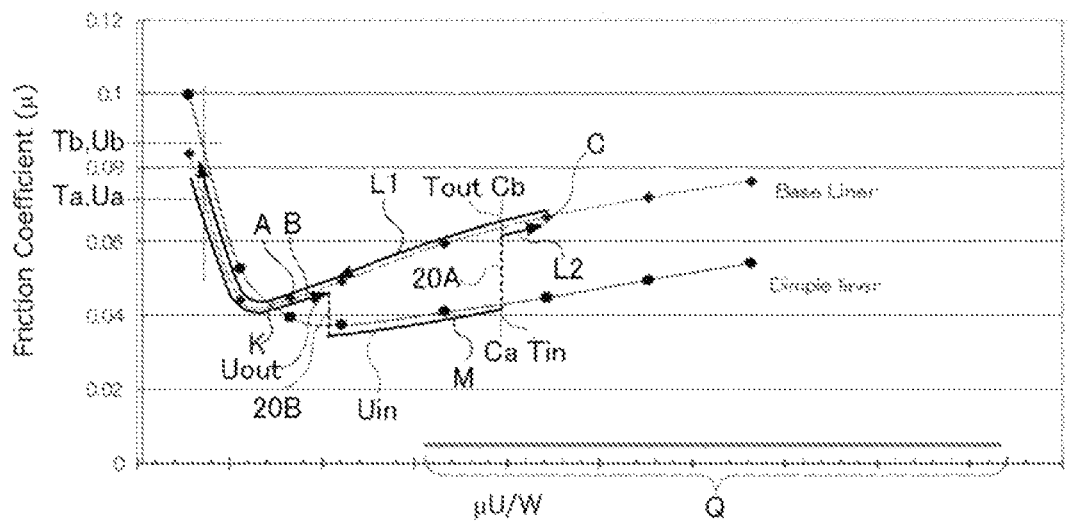
FIGS. 21A and 21B are each a Stribeck diagram for describing the operation control of an internal combustion engine according to a modified example of this embodiment.
Figure 21B:
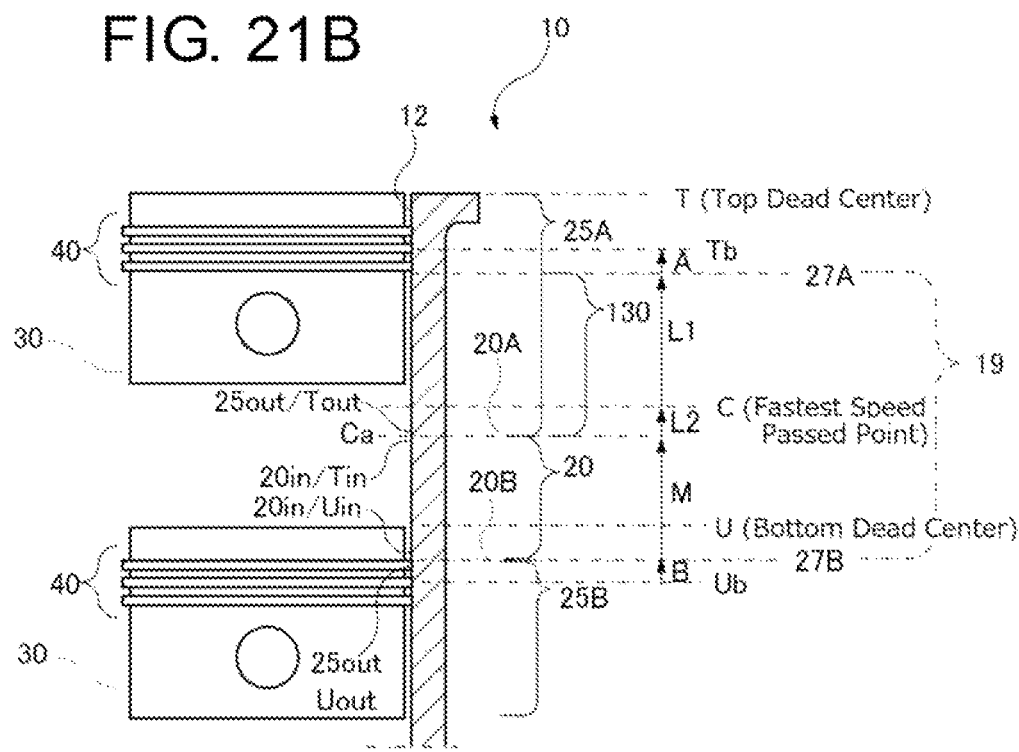

FIGS. 21A and 21B illustrate the stroke in which the piston rings 40 relatively move through the cylinder liner 10 from the bottom dead center U toward the top dead center T. While the piston rings 40 relatively move through the lower outside region 25B of the cylinder liner 10 toward the top dead center, the stroke line B is followed along the dotted line (Base liner) of FIG. 21A. Then, while the piston rings 40 having passed through the lower outside region 25B to enter the stroke center region 20, through which the piston rings 40 are relatively moving, the stroke line M is followed along the solid line (Dimple liner) of FIG. 21A. While the piston rings 40 having passed through the stroke center region 20 enter into the upper smooth region 130 so as to relatively move therethrough, the stroke line L2 is followed along the dotted line (Base liner) of FIG. 21A; furthermore, while the piston rings 40 having passed by the fastest speed passed point C are relatively moving through the upper smooth region 130, the stroke line L1 is followed along the dotted line (Base liner) of FIG. 21A; and while the piston rings 40 having passed through the upper smooth region 130 are relatively moving through the remaining upper outside region 25A, the stroke line A is followed along the dotted line (Base liner) of FIG. 21A. This arrangement makes it possible to further reduce oil consumption by securing a much wider upper smooth region 130.

FIG. 22 and FIG. 23 illustrate another modified example of the sliding structure illustrated in FIG. 16A and FIG. 17A.

In this modified example, the range of the upper smooth region 130 is narrowed, with the result that the edge (upper boundary) 20A of the stroke center region 20 on the side of the top dead center is located above the fastest speed passed point C.

Figure 22A:
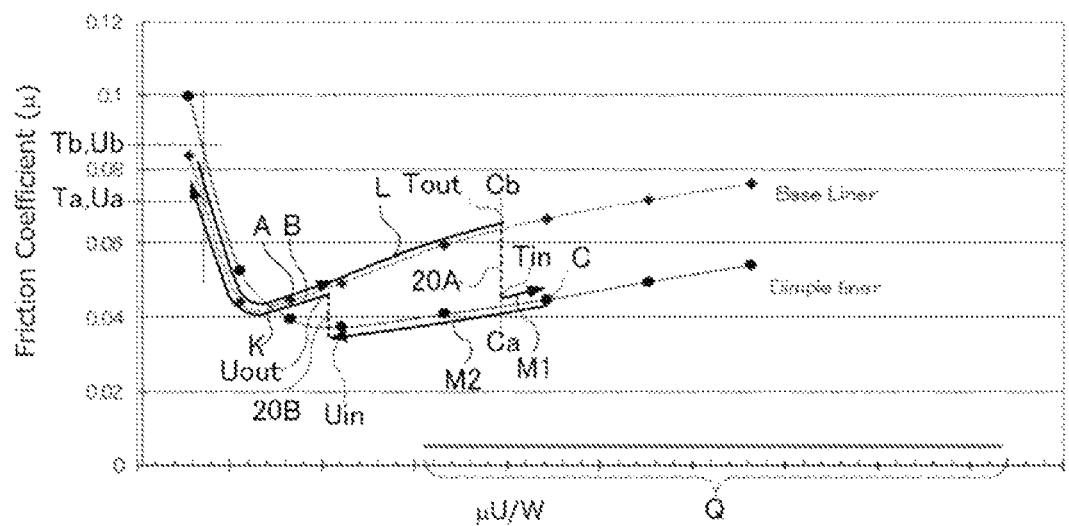
FIGS. 22A and 22B are each a Stribeck diagram for describing the operation control of an internal combustion engine according to a modified example of this embodiment.
Figure 22B:
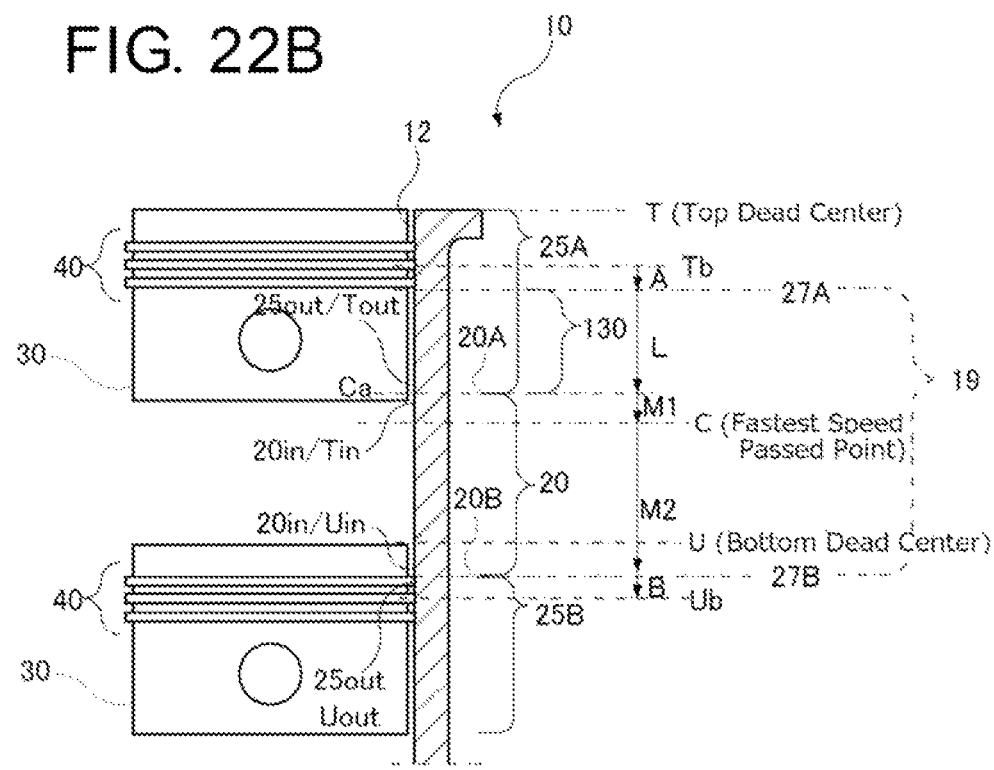

FIGS. 22A and 22B illustrate the stroke in which the piston rings 40 relatively move through the cylinder liner 10 from the top dead center T toward the bottom dead center U. While the piston rings 40 relatively move through the upper outside region 25A and the upper smooth region 130 serving as part thereof, the stroke lines A, L are followed along the dotted line (Base liner) of FIG. 22A. Then, while the piston rings 40 pass through the upper smooth region 130 to enter the stroke center region 20, through which the piston rings 40 are relatively moving, the stroke line M1 is followed along the solid line (Dimple liner) of FIG. 22A. Note that as shown in FIG. 22B, since the piston rings 40 travel past the fastest speed passed point C while relatively moving through the stroke center region 20, the piston rings 40 return at the fastest speed passed point C along the solid line (Dimple liner) as illustrated by the stroke lines M1, M2 in FIG. 22A. Then, the piston rings 40 relatively move along the stroke line M2 to pass through the stroke center region 20 and enter the lower outside region 25B of the cylinder liner 10. After that, while the piston rings 40 are relatively moving toward the bottom dead center, the stroke line B is followed along the dotted line (Base liner) of FIG. 22A.

Figure 23A:
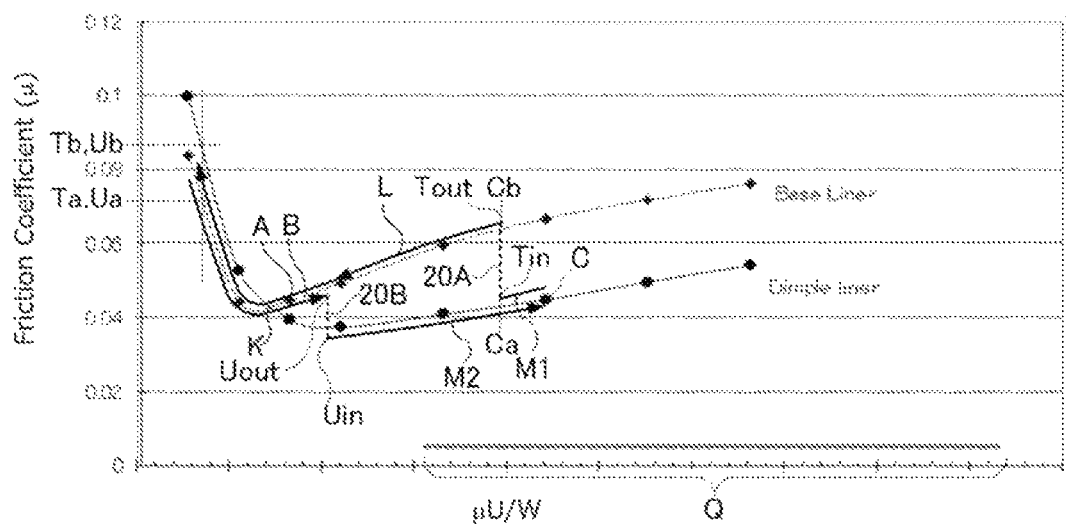
FIGS. 23A and 23B are each a Stribeck diagram for describing the operation control of an internal combustion engine according to a modified example of this embodiment.
Figure 23B:
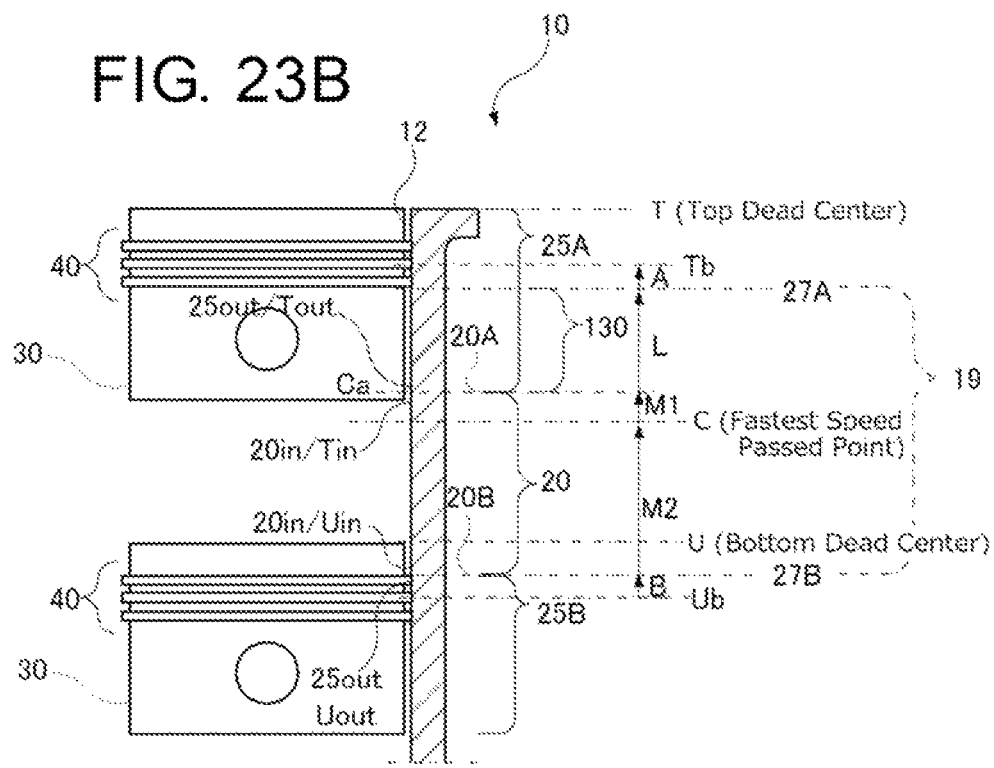

FIGS. 23A and 23B illustrate the stroke in which the piston rings 40 relatively move through the cylinder liner 10 from the bottom dead center U toward the top dead center T. While the piston rings 40 are relatively moving through the lower outside region 25B of the cylinder liner 10 toward the top dead center, the stroke line B is followed along the dotted line (Base liner) of FIG. 23A. Then, while the piston rings 40 pass through the lower outside region 25B to enter the stroke center region 20, through which the piston rings 40 are relatively moving, the stroke line M2 is followed along the solid line (Dimple liner) of FIG. 23A. Furthermore, while the piston rings 40 having traveled past the fastest speed passed point C are relatively moving through the stroke center region 20, the stroke line M1 is followed along the solid line (Dimple liner) of FIG. 23A. While the piston rings 40 pass through the stroke center region 20 to enter the upper smooth region 130 and relatively move therethrough, the stroke line L is followed along the dotted line (Base liner) of FIG. 23A. While the piston rings 40 having passed through the upper smooth region 130 are relatively moving through the remaining upper outside region 25A, the stroke line A is followed along the dotted line (Base liner) of FIG. 23A. This arrangement makes it possible to improve fuel efficiency because the stroke lines M1, M2 along the solid line (Dimple liner) are elongated though the upper smooth region 130 is somewhat narrowed thus causing a little increase in oil consumption.

Example of Verification

Figures 24A, 24B:
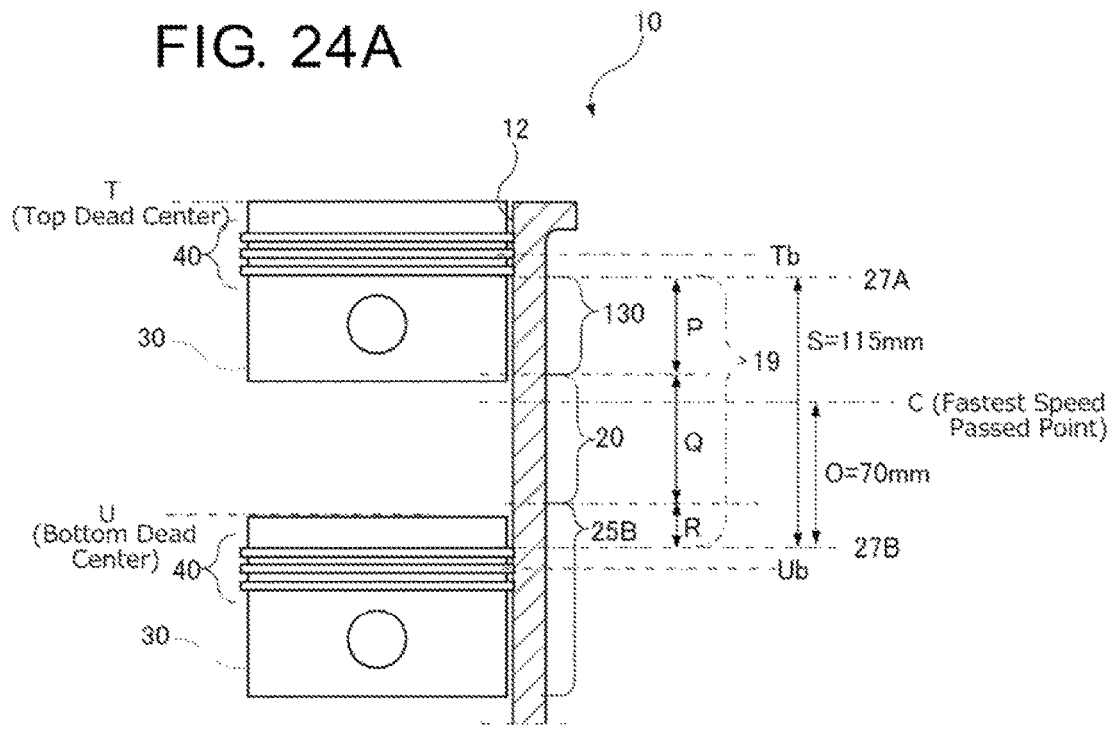
FIG. 24A is a cross-sectional view illustrating a sliding structure of an internal combustion engine according to example experiments of this embodiment; and 24B is a table showing check results.

As illustrated in FIG. 24A, oil consumption (LOC) was verified by preparing Example experiments 1 to 3 and conducting trial runs on the engine at 1800 rpm, where S is the distance of the reference stroke region 19, P is the distance of the upper smooth region 130, Q is the distance of the stroke center region 20, R is the remaining distance of the reference stroke region 19, and the ratio of each stroke was varied. Note that the recesses 14 formed in the stroke center region 20 are formed in the shape of a perfect circle having a diameter of 0.5 mm and a depth of 3.5 Furthermore, the ratio of the area occupied by the recesses 14 in the stroke center region 20 was set to 50%. Furthermore, the distance S of the reference stroke region 19 was set to 115 mm, and the distance O from the edge 27B of this reference step region 19 on the side of the bottom dead center to the fastest speed passed point C which the top ring 50 travels past at the fastest speed was set to 70 mm.

Furthermore, verified was Comparative example 1 in which the entirety of the reference stroke region 19 served as the stroke center region 20, that is, no upper smooth region 130 was provided. Furthermore, also verified was Comparative example 2 in which no stroke center region 20 was provided, that is, no recesses 14 were formed. For the evaluation of oil consumption, employed as the reference oil consumption was the oil consumption or the verification result of Comparative example 2 with no stroke center region 20 provided, and a relative evaluation was conducted on the ratio of another verification result to the reference oil consumption to see the level of increase or decrease.

As illustrated in Comparative example 1 of FIG. 24B, when no upper smooth region 130 is provided and recesses are formed in the entire region, the increase in oil consumption is 90%.

On the other hand, as illustrated in Example experiment 1 of FIG. 24B, when the stroke center region 20 is provided in the entire region below the fastest speed passed point C, in other words, when the upper smooth region 130 occupies 30% or more of the reference stroke region 19, desirably 35% or more, the increase in oil consumption is reduced to 5%. Furthermore, as illustrated in Example experiment 2, when the upper smooth region 130 occupies 5% or more and less than 30% of the reference stroke region 19, the increase in oil consumption is reduced to 60%. Note that as illustrated in Example experiment 3, it can also be seen that almost no change occurs in oil consumption even if the stroke center region 20 is shortened while the upper smooth region 130 is set to the same distance as that in Example experiment 2. That is, it can be seen that the oil consumption depends on the occupancy ratio of the upper smooth region 130. As a matter of course, since the stroke center region 20 preferably has a greater area from the viewpoint of fuel efficiency, it is desirable to set the remaining distance R to generally zero (or 10% or less of the distance S of the reference stroke region 19).

Furthermore, as can be seen from the verification results mentioned above, it is clear that oil consumption can be reduced by shifting the stroke center region 20 toward the bottom dead center with respect to the reference stroke region 19. More specifically, the center point 20M of the stroke center region 20 in the stroke direction may be located on the piston on the side of the bottom dead center with respect to the center point 19M of the reference stroke region in the stroke direction.

Furthermore, in this embodiment, the sliding structure and the RPM control for an internal combustion engine at the idling operation were described; however, the present invention is not limited thereto. That is, such a sliding structure (sliding state) as illustrated in this embodiment may only have to be achieved at the time of any RPM that is higher than the RPM for the idling operation, in the case of which at the idling operation (the time of operation state at an idling RPM), such a case where the sliding structure (sliding state) as illustrated in this embodiment has not been achieved is also included. As a matter of course, the sliding structure illustrated in this embodiment has been preferably achieved at the idling operation, resulting in a high possibility of the sliding structure being continually achieved even in a higher rotational region. Likewise, in an operation mode other than at the idling operation, the RPM control of this embodiment can be applied. For example, for an internal combustion engine such as for ships or trains, the invention may also be applied to the RPM control at the time of typical navigation/traveling. Furthermore, for example, for an internal combustion engine for power generators, the invention may also be applied to the RPM control of the internal combustion engine at the time of steady-state power generation. That is, it is preferable to apply the RPM control of the present invention to an operation mode over an extended period of time which may affect the fuel efficiency of the internal combustion engine.

The present invention is not limited to the embodiments described above, but can be variously modified, as a matter of course, without departing from the scope of the present invention.

The invention claimed is:

1. A sliding structure for an internal combustion engine having a cylinder and a piston, the sliding structure comprising:
the piston having:
an oil ring groove having a lower surface;
an oil ring being disposed in the oil ring groove;
a top ring groove having an upper surface, the top ring groove being located closer to a top of the piston than the oil ring groove along a piston stroke direction; and
a top ring being disposed in the top ring groove; and
the cylinder having:
an inner wall surface;
a reference stroke region of the inner wall surface, the reference stroke region being from a first position corresponding to the lower surface of the oil ring groove when the piston is at a top dead center to a second position corresponding to the upper surface of the top ring groove when the piston is at a bottom dead center;
a stroke center region of the inner wall surface within the reference stroke region, the stroke center region being located below the first position of the reference stroke region, the stroke center region having a plurality of recesses, the stroke center region having an upper edge and a lower edge opposite to each other, the upper edge being located closer to the first position than the lower edge; and
an upper smooth region of the inner wall surface within the reference stroke region, the upper smooth region being free from any of the plurality of recesses, an entirety of the upper smooth region being located from the first position of the reference stroke region to the upper edge of the stroke center region,
wherein an outer circumferential surface of each of the oil ring and the top ring is in contact with the inner wall surface of the cylinder and has inclined surfaces that are inclined with respect to a direction away from the inner wall surface of the cylinder, a gap between the inner wall surface of the cylinder and the outer circumferential surface is configured to flow a lubricating oil into the gap,
at any RPM equal to or greater than an RPM for an idling operation of the internal combustion engine, a center friction coefficient between the inner wall surface and the outer circumferential surface at a place of the stroke center region through which the oil ring and the top ring pass at a highest speed is set to be less than the center friction coefficient when it is assumed that the plurality of recesses are not formed in the stroke center region,
at any RPM equal to or greater than the RPM for the idling operation of the internal combustion engine, an outside friction coefficient between the inner wall surface and the outer circumferential surface when the oil ring and the top ring pass through any place in an outside region that is outside the stroke center region is set to be less than the outside friction coefficient when it is assumed that the plurality of recesses are formed in the outside region, and
a distance along the piston stroke direction of the upper smooth region is 30% or greater of a distance along the piston stroke direction of the reference stroke region.

2. The sliding structure for the internal combustion engine according to claim 1, wherein
a center point of the stroke center region in the piston stroke direction is located closer to the second position of the bottom dead center of the piston than a center point of the reference stroke region in the piston stroke direction.

3. The sliding structure for the internal combustion engine according to claim 1, wherein
when a position at which the top ring passes through the inner wall surface at the highest speed is defined as a fastest speed point, and
the upper edge of the stroke center region is located at or below the fastest speed point.

4. The sliding structure for the internal combustion engine according to claim 1, wherein
a maximum distance of the inclined surfaces from the inner wall surface is set to $\frac{1}{2000}$ or greater of a width of an actual contact area of the outer circumferential surface that is in contact with the inner wall surface.

5. The sliding structure for the internal combustion engine according to claim 1, wherein
a sliding surface of each of the oil ring and the top ring with respect to the cylinder is configured with
a base member,
a first layer formed on the base member, and
a second layer which is deposited on the first layer and softer than the first layer.

6. The sliding structure for the internal combustion engine according to claim 5, wherein
the first layer has a surface roughness (Ra) of 0.7 μm or less.

7. A sliding structure for an internal combustion engine having a cylinder and a piston, the sliding structure comprising:
the piston having:
an oil ring groove having a lower surface;
an oil ring being disposed in the oil ring groove;
a top ring groove having an upper surface, the top ring groove being located closer to a top of the piston than the oil ring groove along a piston stroke direction; and
a top ring being disposed in the top ring groove; and
the cylinder having:
an inner wall surface;
a reference stroke region of the inner wall surface, the reference stroke region being from a first position corresponding to the lower surface of the oil ring groove when the piston is at a top dead center to a second position corresponding to the upper surface of the top ring groove when the piston is at a bottom dead center;
a stroke center region of the inner wall surface within the reference stroke region, the stroke center region being located below the first position of the reference stroke region, the stroke center region having a plurality of recesses, the stroke center region having an upper edge and a lower edge opposite to each other, the upper edge being located closer to the first position than the lower edge; and an upper smooth region of the inner wall surface within the reference stroke region, the upper smooth region being free from any of the plurality of recesses, an entirety of the upper smooth region being located from the first position of the reference stroke region to the upper edge of the stroke center region, wherein an outer circumferential surface of each of the oil ring and the top ring is in contact with the inner wall surface of the cylinder and has inclined surfaces that are inclined with respect to a direction away from the inner wall surface of the cylinder, a gap between the inner wall surface of the cylinder and the outer circumferential surface is configured to flow a lubricating oil into the gap, at any RPM equal to or greater than an RPM for an idling operation of the internal combustion engine, a boundary center side friction coefficient when the oil ring and the top ring pass through a vicinity region in the stroke center region adjacent to a boundary between the stroke center region and an outside region outside the stroke center region is set to be less than a boundary outside friction coefficient when the oil ring and the top ring pass through a vicinity region in the outside region adjacent to the boundary, and a distance along the piston stroke direction of the upper smooth region is 30% or greater of a distance along the piston stroke direction of the reference stroke region.

8. The sliding structure for the internal combustion engine according to claim 7, wherein
a center point of the stroke center region in the piston stroke direction is located closer to the second position of the bottom dead center of the piston than a center point of the reference stroke region in the piston stroke direction.

9. The sliding structure for the internal combustion engine according to claim 7, wherein
when a position at which the top ring passes through the inner wall surface at a highest speed is defined as a fastest speed point, and
the upper edge of the stroke center region is located at or below the fastest speed point.

10. The sliding structure for the internal combustion engine according to claim 7, wherein
at any RPM equal to or greater than the RPM for the idling operation of the internal combustion engine, a center friction coefficient between the inner wall surface and the outer circumferential surface at a place of the stroke center region through which the oil ring and the top ring pass at a highest speed is set to be less than the center friction coefficient when it is assumed that the plurality of recesses are not formed in the stroke center region, and
at any RPM equal to or greater than the RPM for the idling operation of the internal combustion engine, an outside friction coefficient between the inner wall surface and the outer circumferential surface when the oil ring and the top ring pass through any place in an outside region that is outside the stroke center region is set to be less than the outside friction coefficient when it is assumed that the plurality of recesses are formed in the outside region.

11. The sliding structure for the internal combustion engine according to claim 7, wherein
a ratio ($\mu1/\mu2$) of the boundary outside friction coefficient $\mu1$ to the boundary center side friction coefficient $\mu2$ is set to within a range of 2.5 or less.

12. The sliding structure for the internal combustion engine according to claim 11, wherein
the ratio ($\mu1/\mu2$) of the boundary outside friction coefficient $\mu1$ to the boundary center side friction coefficient $\mu2$ is set to within a range of 1.5 or less.

13. The sliding structure for the internal combustion engine according to claim 7, wherein
a maximum distance of the inclined surfaces from the inner wall surface is set to $1/2000$ or greater of a width of an actual contact area of the outer circumferential surface that is in contact with the inner wall surface.

14. The sliding structure for the internal combustion engine according to claim 7, wherein
a sliding surface of each of the oil ring and the top ring with respect to the cylinder is configured with
a base member,
a first layer formed on the base member, and
a second layer which is deposited on the first layer and softer than the first layer.

15. A method for controlling an idling operation of an internal combustion engine having a cylinder and a piston, the method comprising the steps of:
providing the piston, the piston having:
an oil ring groove having a lower surface;
an oil ring being disposed in the oil ring groove;
a top ring groove having an upper surface, the top ring groove being located closer to a top of the piston than the oil ring groove along a piston stroke direction; and
a top ring being disposed in the top ring groove;
providing an inner wall surface of the cylinder;
providing a reference stroke region of the inner wall surface, the reference stroke region being from a first position corresponding to the lower surface of the oil ring groove when the piston is at a top dead center to a second position corresponding to the upper surface of the top ring groove when the piston is at a bottom dead center;
providing a stroke center region of the inner wall surface within the reference stroke region, the stroke center region being located below the first position of the reference stroke region, the stroke center region having a plurality of recesses, the stroke center region having an upper edge and a lower edge opposite to each other, the upper edge being located closer to the first position than the lower edge; and
providing an upper smooth region of the inner wall surface within the reference stroke region, the upper smooth region being free from any of the plurality of recesses, an entirety of the upper smooth region being located from the first position of the reference stroke region to the upper edge of the stroke center region,
wherein an outer circumferential surface of each of the oil ring and the top ring is in contact with the inner wall surface of the cylinder and has inclined surfaces that are inclined with respect to a direction away from the inner wall surface of the cylinder, a gap between the inner wall surface of the cylinder and the outer circumferential surface is configured to flow a lubricating oil into the gap, a distance along the piston stroke direction of the upper smooth region is 30% or greater of a distance along the piston stroke direction of the reference stroke region, and an RPM at an idling operation of the internal combustion engine is controlled so as to satisfy a condition A and a condition B below:

the condition A: a center friction coefficient between the inner wall surface and the outer circumferential surface at a place of the stroke center region through which the oil ring and the top ring pass at a highest speed is to be less than the center friction coefficient when it is assumed that the plurality of recesses are not formed in the stroke center region; and the condition B: an outside friction coefficient between the inner wall surface and the outer circumferential surface at any place in an outside region that is outside the stroke center region is to be less than the outside friction coefficient when it is assumed that the plurality of recesses are formed in the outside region.

16. The method according to claim 15, wherein
a center point of the stroke center region in the piston stroke direction is located closer to the second position of the bottom dead center of the piston than the center point of the reference stroke region in the piston stroke direction.

17. The method according to claim 15, wherein
when a position at which the top ring passes through the inner wall surface at the highest speed is defined as a fastest speed point, and
the upper edge of the stroke center region is located at or below the fastest speed point.

18. A method for controlling an idling operation of an internal combustion engine having a cylinder and a piston, the method comprising the steps of:
providing the piston, the piston having:
an oil ring groove having a lower surface;
an oil ring being disposed in the oil ring groove;
a top ring groove having an upper surface, the top ring groove being located closer to a top of the piston than the oil ring groove along a piston stroke direction; and
a top ring being disposed in the top ring groove;
providing an inner wall surface of the cylinder;
providing a reference stroke region of the inner wall surface, the reference stroke region being from a first position corresponding to the lower surface of the oil ring groove when the piston is at a top dead center to a second position corresponding to the upper surface of the top ring groove when the piston is at a bottom dead center;
providing a stroke center region of the inner wall surface within the reference stroke region, the stroke center region being located below the first position of the reference stroke region, the stroke center region having a plurality of recesses, the stroke center region having an upper edge and a lower edge opposite to each other, the upper edge being located closer to the first position than the lower edge; and
providing an upper smooth region of the inner wall surface within the reference stroke region, the upper smooth region being free from any of the plurality of recesses, an entirety of the upper smooth region being located from the first position of the reference stroke region to the upper edge of the stroke center region, wherein an outer circumferential surface of each of the oil ring and the top ring is in contact with the inner wall surface of the cylinder and has inclined surfaces that are inclined with respect to a direction away from the inner wall surface of the cylinder, a gap between the inner wall surface of the cylinder and the outer circumferential surface is configured to flow a lubricating oil into the gap, a distance along the piston stroke direction of the upper smooth region is 30% or greater of a distance along the piston stroke direction of the reference stroke region, and an RPM at an idling operation of the internal combustion engine is controlled so as to satisfy a condition C below:

the condition C: a boundary center side friction coefficient when the oil ring and the top ring pass through a vicinity region in the stroke center region adjacent to a boundary between the stroke center region and an outside region outside the stroke center region is set to be less than a boundary outside friction coefficient when the oil ring and the top ring pass through a vicinity region in the outside region adjacent to the boundary.

19. The method according to claim 18, wherein
the RPM at the idling operation of the internal combustion engine is controlled so as to satisfy a condition A and a condition B below:

the condition A: a center friction coefficient between the inner wall surface and the outer circumferential surface at a place of the stroke center region through which the oil ring and the top ring pass at a highest speed is to be less than the center friction coefficient when it is assumed that the plurality of recesses are not formed in the stroke center region; and the condition B: an outside friction coefficient between the inner wall surface and the outer circumferential surface at any place in an outside region that is outside the stroke center region is to be less than the outside friction coefficient when it is assumed that the plurality of recesses are formed in the outside region.

20. The method according to claim 18, wherein
the RPM at the idling operation of the internal combustion engine is controlled so as to satisfy a condition D below:

the condition D: a ratio ($\mu1/\mu2$) of the boundary outside friction coefficient $\mu1$ to the boundary center side friction coefficient $\mu2$ is to be within the range of 2.5 or less.

21. The method according to claim 18, wherein
a center point of the stroke center region in a stroke direction is located on a side of the bottom dead center of the piston with respect to the center point of the reference stroke region in the stroke direction.

22. The method according to claim 18, wherein
when a position at which the top ring passes through the inner wall surface at a highest speed is defined as a fastest speed point,
the upper edge of the stroke center region is located at or below the fastest speed point.

23. A method for controlling an operation of an internal combustion engine having a cylinder and a piston, the method comprising the steps of:
providing the piston, the piston having:
an oil ring groove having a lower surface;
an oil ring being disposed in the oil ring groove;

a top ring groove having an upper surface, the top ring groove being located closer to a top of the piston than the oil ring groove along a piston stroke direction; and a top ring being disposed in the top ring groove;

providing an inner wall surface of the cylinder;

providing a reference stroke region of the inner wall surface, the reference stroke region being from a first position corresponding to the lower surface of the oil ring groove when the piston is at a top dead center to a second position corresponding to the upper surface of the top ring groove when the piston is at a bottom dead center;

providing a stroke center region of the inner wall surface within the reference stroke region, the stroke center region being located below the first position of the reference stroke region, the stroke center region having a plurality of recesses, the stroke center region having an upper edge and a lower edge opposite to each other, the upper edge being located closer to the first position than the lower edge; and providing an upper smooth region of the inner wall surface within the reference stroke region, the upper smooth region not having being free from any of the plurality of recesses, an entirety of the upper smooth region being located from the first position of the reference stroke region to the upper edge of the stroke center region, wherein an outer circumferential surface of each of the oil ring and the top ring is in contact with the inner wall surface of the cylinder and has inclined surfaces that are inclined with respect to a direction away from the inner wall surface of the cylinder, a gap between the inner wall surface of the cylinder and the outer circumferential surface is configured to flow a lubricating oil into the gap, a distance along the piston stroke direction of the upper smooth region is 30% or greater of a distance along the piston stroke direction of the reference stroke region, an RPM of the internal combustion engine is controlled so as to satisfy a condition A and a condition B below:

the condition A: a center friction coefficient between the inner wall surface and the outer circumferential surface at a place of the stroke center region through which the oil ring and the top ring pass at a highest speed is to be less than the center friction coefficient when it is assumed that the plurality of recesses are not formed in the stroke center region; and the condition B: an outside friction coefficient between the inner wall surface and the outer circumferential surface at any place in an outside region that is outside the stroke center region is to be less than the outside friction coefficient when it is assumed that the plurality of recesses are formed in the outside region.

24. The method according to claim 23, wherein a center point of the stroke center region in the piston stroke direction is located closer to the second position of the bottom dead center of the piston than a center point of the reference stroke region in the piston stroke direction.

25. The method according to claim 23, wherein when a position at which the top ring passes through the inner wall surface at the highest speed is defined as a fastest speed point, and the upper edge of the stroke center region is located at or below the fastest speed point.

26. A method for controlling an operation of an internal combustion engine having a cylinder and a piston, the method comprising the steps of:

providing the piston, the piston having:
an oil ring groove having a lower surface;
an oil ring being disposed in the oil ring groove;
a top ring groove having an upper surface, the top ring groove being located closer to a top of the piston than the oil ring groove along a piston stroke direction; and a top ring being disposed in the top ring groove;

providing an inner wall surface of the cylinder;

providing a reference stroke region of the inner wall surface, the reference stroke region being from a first position corresponding to the lower surface of the oil ring groove when the piston is at a top dead center to a second position corresponding to the upper surface of the top ring groove when the piston is at a bottom dead center;

providing a stroke center region of the inner wall surface within the reference stroke region, the stroke center region being located below the first position of the reference stroke region, the stroke center region having a plurality of recesses, the stroke center region having an upper edge and a lower edge opposite to each other, the upper edge being located closer to the first position than the lower edge; and providing an upper smooth region of the inner wall surface within the reference stroke region, the upper smooth region being free from any of the plurality of recesses, an entirety of the upper smooth region being located from the first position of the reference stroke region to the upper edge of the stroke center region, wherein an outer circumferential surface of each of the oil ring and the top ring is in contact with the inner wall surface of the cylinder and has inclined surfaces that are inclined with respect to a direction away from the inner wall surface of the cylinder, a gap between the inner wall surface of the cylinder and the outer circumferential surface is configured to flow a lubricating oil into the gap, a distance along the piston stroke direction of the upper smooth region is 30% or greater of a distance along the piston stroke direction of the reference stroke region, and an RPM of the internal combustion engine is controlled so as to satisfy a condition C below:

the condition C: a boundary center side friction coefficient when the oil ring and the top ring pass through a vicinity region in the stroke center region adjacent to a boundary between the stroke center region and an outside region outside the stroke center region is set to be less than a boundary outside friction coefficient when the oil ring and the top ring pass through a vicinity region in the outside region adjacent to the boundary.

27. The method according to claim 26, wherein a ratio ($\mu 1/\mu 2$) of the boundary outside friction coefficient $\mu 1$ to the boundary center side friction coefficient $\mu 2$ is set to within a range of 2.5 or less.

28. The method according to claim 26, wherein a center point of the stroke center region in the piston stroke direction is located closer to the second position of the bottom dead center of the piston than a center point of the reference stroke region in the piston stroke direction.

29. The method according to claim 26, wherein
when a position at which the top ring passes through the inner wall surface at a highest speed is defined as a fastest speed point, and
the upper edge of the stroke center region is located at or below the fastest speed point.

\* \* \* \* \*